US012216855B2

(12) United States Patent
Shin et al.

(10) Patent No.: US 12,216,855 B2
(45) Date of Patent: Feb. 4, 2025

(54) TOUCH DISPLAY DEVICE

(71) Applicant: LG DISPLAY CO., LTD., Seoul (KR)

(72) Inventors: SeungRok Shin, Gyeonggi-do (KR); Sangkyu Kim, Gyeonggi-do (KR); Yoonnara Jang, Seoul (KR); Jeonghoon Lee, Gyeonggi-do (KR); DeukSu Lee, Seoul (KR)

(73) Assignee: LG Display Co., Ltd. (KR)

( * ) Notice: Subject to any disclaimer, the term of this patent is extended or adjusted under 35 U.S.C. 154(b) by 133 days.

(21) Appl. No.: 18/083,605

(22) Filed: Dec. 19, 2022

(65) Prior Publication Data

US 2023/0214050 A1 Jul. 6, 2023

(30) Foreign Application Priority Data

Dec. 30, 2021 (KR) .................. 10-2021-0193366

(51) Int. Cl.
*G06F 3/041* (2006.01)
*G06F 3/044* (2006.01)

(52) U.S. Cl.
CPC ........ *G06F 3/04164* (2019.05); *G06F 3/0443* (2019.05); *G06F 3/0446* (2019.05); *G06F 3/0412* (2013.01); *G06F 2203/04107* (2013.01); *G06F 2203/04111* (2013.01)

(58) Field of Classification Search
CPC .. G06F 3/04164; G06F 3/0443; G06F 3/0446; G06F 3/0448
See application file for complete search history.

(56) References Cited

U.S. PATENT DOCUMENTS

| | | | | |
|---|---|---|---|---|
| 8,810,543 B1* | 8/2014 | Kurikawa | ........... | G06F 3/04166 345/173 |
| 9,740,326 B2* | 8/2017 | Shen | ..................... | G06F 3/0446 |
| 11,455,066 B2* | 9/2022 | Cho | ..................... | G06F 3/0446 |
| 2008/0252608 A1* | 10/2008 | Geaghan | ............... | G06F 3/0446 345/173 |
| 2010/0156795 A1* | 6/2010 | Kim | ..................... | G06F 3/0416 715/764 |
| 2011/0062971 A1* | 3/2011 | Badaye | ................. | G06F 3/0443 324/686 |
| 2011/0141040 A1* | 6/2011 | Kang | ..................... | G06F 3/0446 345/173 |
| 2011/0148435 A1* | 6/2011 | Schwartz | ........... | G01R 27/2605 324/658 |
| 2014/0049121 A1* | 2/2014 | Liu | ........................ | G06F 3/044 307/650 |
| 2014/0253498 A1* | 9/2014 | Suzuki | ................. | G06F 3/0445 345/174 |
| 2017/0372110 A1* | 12/2017 | Uehara | .................... | G06F 21/32 |
| 2018/0151662 A1* | 5/2018 | Rhe | ........................ | H10K 59/40 |

(Continued)

*Primary Examiner* — Amy Onyekaba
(74) *Attorney, Agent, or Firm* — Fish & Richardson P.C.

(57) ABSTRACT

The present disclosure is directed to a touch display device that is capable of reducing a load of a touch sensor structure disposed in a display panel and improving the accuracy of touch sensing capabilities of the touch display device. In one aspect, touch electrode lines disposed on an active area are disposed to be separated into a plurality of sub-areas. A number of touch routing lines connected to the touch electrode lines are disposed on the active area, thus a touch sensor structure with a reduced load can be provided while minimizing an increase of a non-active area due to an arrangement of the touch routing lines.

19 Claims, 15 Drawing Sheets

(56) References Cited

U.S. PATENT DOCUMENTS

| | | | |
|---|---|---|---|
| 2018/0188867 A1* | 7/2018 | Yeh | G06F 3/0443 |
| 2019/0056834 A1* | 2/2019 | Blondin | G06F 3/044 |
| 2019/0302934 A1* | 10/2019 | Rhe | G06F 3/047 |
| 2019/0302943 A1* | 10/2019 | Rhe | G06F 3/047 |
| 2019/0302944 A1* | 10/2019 | Rhe | G06F 3/0445 |
| 2020/0110490 A1* | 4/2020 | Zhang | G06F 3/047 |
| 2020/0321404 A1* | 10/2020 | Kim | H10K 50/131 |
| 2022/0107707 A1* | 4/2022 | Bang | G06F 3/0445 |
| 2023/0094957 A1* | 3/2023 | Lee | G06F 3/0412 |
| | | | 345/174 |
| 2023/0128593 A1* | 4/2023 | Ye | G06F 3/0448 |
| | | | 345/173 |
| 2023/0300451 A1* | 9/2023 | Cheon | H04N 23/80 |
| | | | 348/240.2 |

\* cited by examiner

TOUCH DISPLAY DEVICE

CROSS REFERENCE TO RELATED APPLICATION

This application claims priority from Republic of Korea Patent Application No. 10-2021-0193366, filed on Dec. 30, 2021, which is hereby incorporated by reference in its entirety.

BACKGROUND

Field

Embodiments of the present disclosure are related to a touch display device.

Description of Related Art

A display device can recognize a touch by a finger or a pen of a user on a display panel and process an input based on the recognized touch to provide various functions to the user.

The display device, for example, can include a plurality of touch electrodes disposed in the display panel. The display device can drive the plurality of touch electrodes, and can sense a touch of the user by detecting a change of a capacitance generated when the user touches the display panel.

A load of a touch sensor structure disposed in the display panel can increase as a size of the display panel increases. The accuracy of touch sensing can drop due to this increase in the load of the touch sensor structure.

SUMMARY

Embodiments of the present disclosure can provide a touch display device that is capable of reducing a load of a touch sensor structure disposed in a display panel and improving the accuracy of touch sensing capabilities of the touch display device.

In one aspect, a touch display device includes a plurality of light-emitting elements disposed on an active area of a display panel, an encapsulation layer disposed on the plurality of light-emitting elements, and a plurality of X-touch electrode lines on the encapsulation layer, comprising two or more X-touch electrodes electrically connected to each other along a first direction, and disposed on each of a plurality of sub-areas included in the active area separately. The touch display device further includes a plurality of Y-touch electrode lines on the encapsulation layer, comprising two or more Y-touch electrodes electrically connected to each other along a second direction crossing the first direction, and disposed on each of the plurality of sub-areas separately, and a plurality of touch routing lines electrically connected to one of the plurality of X-touch electrode lines and the plurality of Y-touch electrode lines. The plurality of sub-areas include a plurality of boundary sub-areas having a boundary positioned on a first boundary of a first side of the active area or a second boundary of a second side opposing the first side, and at least one central sub-area positioned between two of the plurality of boundary sub-areas, at least one of the plurality of boundary sub-area including a plurality of X-touch routing lines, wherein a part of at least one of the plurality of X-touch routing lines is electrically connected to one of the plurality of X-touch electrode lines.

In another aspect, the plurality of X-touch electrode lines in the at least one central sub-area are connected to two or more of the plurality of X-touch routing lines on both sides of the at least one central sub-area.

In another aspect, each of the plurality of X-touch electrode lines in the at least one central sub-area comprises a first portion and a second portion separated from each other, and wherein each of the first portion and the second portion is connected to a different one of the plurality of X-touch routing lines.

In another aspect, a number of the plurality of X-touch electrode lines in the at least one central sub-area is identical to a number of the plurality of X-touch electrode lines in each of the plurality of boundary sub-areas, and wherein a number of the plurality of Y-touch electrode lines in the at least one central sub-area is smaller than a number of the plurality of Y-touch electrode lines in each of the plurality of boundary sub-areas.

In another aspect, a size of the at least one central sub-area is smaller than a size of each of the plurality of boundary sub-areas.

In another aspect, the touch display device further includes at least one first dummy electrode disposed between the X-touch routing line electrically connected to the plurality of X-touch electrode lines in the at least one central sub-area, and at least one second dummy electrode disposed between the plurality of X-touch electrode lines in one of the plurality of boundary sub-areas.

In another aspect, the at least one first dummy electrode and the at least one second dummy electrode are floating.

In another aspect, the touch display device further includes at least one first dummy electrode is disposed on a portion of the at least one central sub-area corresponding to one of the plurality of X-touch routing lines in the at least one central sub-area, the one of the plurality of X-touch routing lines being electrically connected to one of the plurality of X-touch electrode lines in one of the plurality of boundary sub-areas.

In another aspect, the at least one central sub-area comprises a first central sub-area and a second central sub-area, and wherein a part of a Y-touch routing line to which each of a plurality of Y-touch electrode lines in the first central sub-area is connected, is disposed in the second central sub-area.

In another aspect, the touch display device further includes at least one dummy electrode disposed on an area of the first central sub-area corresponding to an area where the Y-touch routing line is disposed.

In another aspect, the Y-touch routing line in the second boundary sub-area crosses one of the plurality of X-touch routing lines that is electrically connected to one of the plurality of X-touch electrode lines in the at least one central sub-area.

In another aspect, the touch display device further includes at least one dummy electrode disposed in an area of the first boundary area corresponding to an area where the Y-touch routing line is disposed.

In another aspect, on outside of the active area, a width of a first one of the plurality of X-touch routing lines that is electrically connected to at least one of the plurality of X-touch electrode lines in the at least one central sub-area, is greater than a width of a second one of the plurality of X-touch routing lines that is electrically connected to at least one of the plurality of X-touch electrode lines in the plurality of boundary sub-areas.

In another aspect, a touch driving signal is supplied to the plurality of X-touch electrode lines, and a touch sensing signal is detected from the plurality of Y-touch electrode lines.

In one aspect, a touch display device includes a plurality of X-touch electrode lines comprising two or more X-touch electrodes electrically connected to each other along a first direction, and disposed on each of a plurality of sub-areas included in an active area separately; a plurality of Y-touch electrode lines comprising two or more Y-touch electrodes electrically connected to each other along a second direction crossing the first direction, and disposed on each of the plurality of sub-areas separately, and a plurality of touch routing lines electrically connected to one of the plurality of X-touch electrode lines and the plurality of Y-touch electrode lines. The plurality of sub-areas includes a plurality of boundary sub-areas positioned on a first boundary of a first side of the active area or a second boundary of a second side opposing the first side, and at least one central sub-area positioned between two of the plurality of boundary sub-areas, at least one of the plurality of boundary sub-area including a plurality of X-touch routing lines, wherein a part of at least one of the plurality of X-touch routing lines is in the active area.

In one aspect, a touch display device includes a plurality of X-touch electrode lines comprising two or more X-touch electrodes electrically connected to each other along a first direction, and disposed on each of a plurality of sub-areas included in an active area separately, a plurality of Y-touch electrode lines comprising two or more Y-touch electrodes electrically connected to each other along a second direction crossing the first direction, and disposed on each of the plurality of sub-areas separately, a plurality of X-touch routing lines electrically connected to one of the plurality of X-touch electrode lines, and a plurality of Y-touch routing lines electrically connected to one of the plurality of Y-touch electrode lines. The at least one or more of the plurality of X-touch routing lines is disposed on a first sub-area of the plurality of sub-areas and is electrically connected to at least one of the plurality of X-touch electrode lines disposed on a second sub-area. At least one or more of the plurality of Y-touch routing lines is disposed on the first sub-area and is electrically connected to at least one of the plurality of the Y-touch electrode line disposed on a third sub-area. The one or more of the plurality of X-touch routing lines in the first sub-area crosses the one or more of the plurality of Y-touch routing lines in the first sub-area.

In another aspect, the touch display device further includes at least one dummy electrode disposed on at least one of (1) a portion of the second sub-area that corresponds to a portion where the one or more of the plurality of X-touch routing lines are disposed in the first sub-area, and (2) a portion of the third sub-area that corresponds to a portion where the one or more of the plurality of Y-touch routing lines are disposed in the first sub-area.

In another aspect, at least one of the plurality of X-touch routing lines or the plurality of Y-touch routing lines in the second sub-area or the third sub-area crosses the portion in which the at least one dummy electrode is disposed, and is electrically connected to a touch electrode line in a sub-area other than a sub-area on which the at least one dummy electrode is disposed.

In another aspect, the plurality of X-touch electrode lines and the plurality of Y-touch electrode lines are disposed on a same layer.

In another aspect, the plurality of X-touch electrode lines and the plurality of X-touch routing lines are disposed on a same layer.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
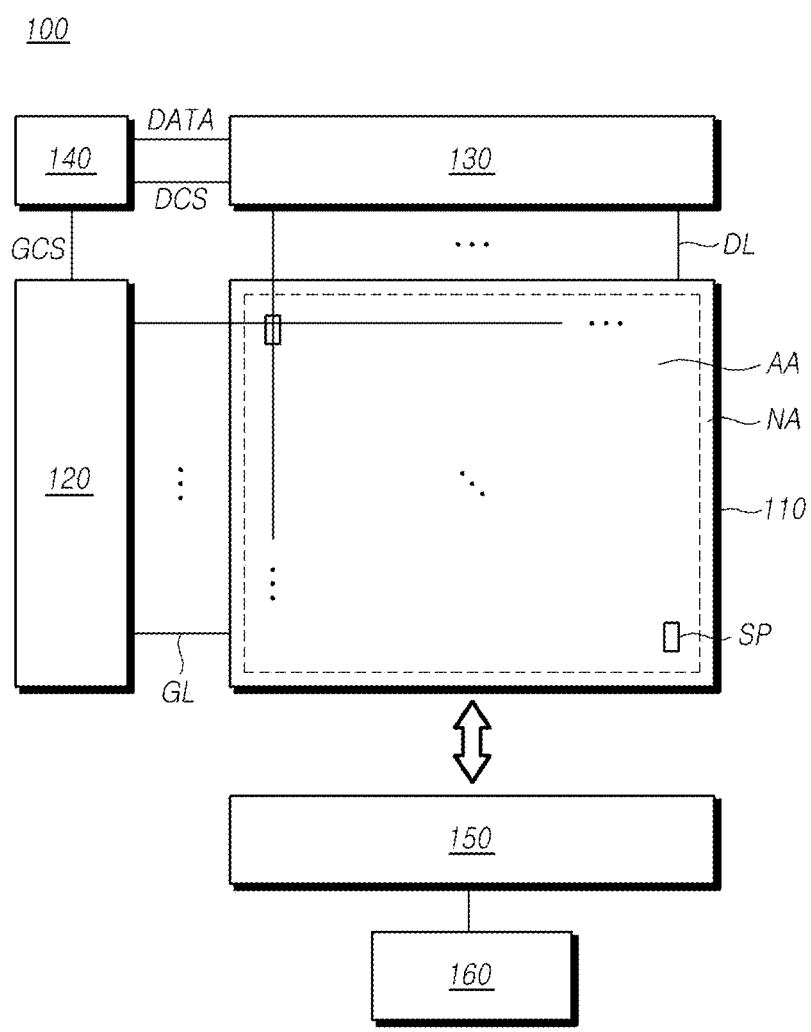
FIG. 1 is a diagram schematically illustrating a configuration of a touch display device according to some aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. A person skilled in the relevant art will recognize that other components and configurations may be used without parting from the spirit and scope of the disclosure. Thus, the following description and drawings are illustrative and are not to be construed as limiting. References to one or an embodiment in the present disclosure can be references to the same embodiment or any embodiment and, such references mean at least one of the embodiments. The shapes, sizes, proportions, angles, numbers, and the like disclosed in the drawings for explaining the embodiments of the present disclosure are illustrative, and the present disclosure is not limited to the illustrated matters. Further, in the following description of examples or embodiments of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

In the case of a description of a positional relationship, for example, when the positional relationship of two parts is described as 'on', 'over', 'below', 'beside', and the like, one or more other parts may be positioned between two parts unless 'right' or 'directly' is used.

In the case of a description of a temporal relationship, for example, when a temporal precedence is described as 'after', 'following', 'after', 'before', and the like, cases that are not continuous may be included unless 'directly' or 'directly' is used.

Although a first, a second and the like are used to describe various components, these components are not limited by these terms. These terms are only used to distinguish one component from another component. Therefore, a first component mentioned below may be a second component within the technical spirit of the present disclosure.

Respective features of various embodiments of the present disclosure can be partially or wholly connected to or combined with each other and can be technically interlocked and driven variously, and respective embodiments may be independently implemented from each other or may be implemented together with a related relationship.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a diagram schematically illustrating a configuration of a touch display device 100, according to some aspects of the present disclosure.

Referring to FIG. 1, the touch display device 100 can include a display panel 110, and a gate driving circuit 120, a data driving circuit 130 and a controller 140 for driving the display panel 110. The touch display device 100 can further include any other known or to be developed components for touch sensing other than components for a display driving.

The display panel 110 can include an active area AA where a plurality of subpixels SP is disposed and a non-active area NA which is located outside the active area AA. A plurality of gate lines GL and a plurality of data lines DL can be disposed in the display panel 110. The plurality of subpixels SP can be located in areas where the gate lines GL and the data lines DL intersect each other.

The gate driving circuit 120 is controlled by the controller 140. The gate driving circuit 120 can sequentially output scan signals to the plurality of gate lines GL arranged on the display panel 110, thereby controlling the driving timing of the plurality of subpixels SP.

The gate driving circuit 120 can include one or more gate driver integrated circuits GDIC. The gate driving circuit 120 can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method. Alternatively, each gate driver integrated circuit GDIC can be implemented by a gate-in-panel GIP method to then be directly arranged on the display panel 110. Alternatively, each gate driver integrated circuit GDIC can be integrated and arranged on the display panel 110. Alternatively, each gate driver integrated circuit GDIC can be implemented by a chip-on-film COF method in which an element is mounted on a film connected to the display panel 110.

The data driving circuit 130 can receive image data DATA from the controller 140 and convert the image data DATA into an analog data voltage VDATA. The data driving circuit 130 can output the data voltage VDATA to each data line DL according to the timing at which the scan signal is applied through the gate line GL so that each of the plurality of subpixels SP emits light having brightness according to the image data.

The data driving circuit 130 can include one or more source driver integrated circuits SDIC. Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method. Alternatively, each source driver integrated circuit SDIC can be directly disposed on the display panel 110. Alternatively, each source driver integrated circuit SDIC can be integrated and arranged on the display panel 110. Alternatively, each source driver integrated circuit SDIC can be implemented by a chip-on-film COF method. In this case, each source driver integrated circuit SDIC can be mounted on a film connected to the display panel 110, and can be electrically connected to the display panel 110 through wires on the film.

The controller 140 can supply various control signals to the gate driving circuit 120 and the data driving circuit 130, and can control the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 can allow the gate driving circuit 120 to output a scan signal according to the timing implemented in each frame. The controller 140 can convert a data signal received from the outside (e.g., a host system) to conform to the data signal format used in the data driving circuit 130 and then can output the converted image data DATA to the data driving circuit 130.

The controller 140 can receive, from an external component or system (e.g., a host system), various timing signals including a vertical synchronization signal VSYNC, a horizontal synchronization signal HSYNC, an input data enable DE signal, a clock signal CLK, and the like, as well as the image data DATA.

The controller 140 can generate various control signals using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, a gate output enable signal GOE, or the like.

The gate start pulse GSP can control the start time of one or more gate driver integrated circuits GDIC that constitute the gate driving circuit 120. The gate shift clock GSC, which is a clock signal commonly input to one or more gate driver integrated circuits GDIC, can control the shift timing of a scan signal. The gate output enable signal GOE can specify timing information on one or more gate driver integrated circuits GDIC.

In addition, to control the data driving circuit 130, the controller 140 can output various data control signals DCS including a source start pulse SSP, a source sampling clock SSC, a source output enable signal SOE, or the like.

The source start pulse SSP can control a data sampling start timing of one or more source driver integrated circuits SDIC constituting the data driving circuit 130. The source sampling clock SSC can be a clock signal for controlling the timing of sampling data in the respective source driver integrated circuits SDIC. The source output enable signal SOE can control the output timing of the data driving circuit 130.

The touch display device 100 can further include a power management integrated circuit for supplying various voltages or currents to the display panel 110, the gate driving circuit 120, the data driving circuit 130, and the like or controlling various voltages or currents to be supplied thereto.

Each subpixel SP can be a region which is defined by a cross of the gate line GL and the data line DL, and according to types of the touch display device 100, a liquid crystal layer can be disposed on the subpixel SP or an element emitting a light can be disposed on the subpixel SP.

For example, in the case that the touch display device 100 is an organic light-emitting display device, an organic light-emitting diode OLED and various circuit elements can be disposed on the subpixel SP. By controlling a current supplied to the organic light-emitting diode OLED by various circuit elements, each subpixel SP can represent a luminance corresponding to an image data.

Alternatively, in some cases, a light-emitting diode LED, micro light-emitting diode μLED or quantum dot light-emitting diode QLED can be disposed on the subpixel SP.

The touch display device 100 according to embodiments of the present disclosure can include a touch driving circuit 150 and a touch controller 160 for providing a touch sensing function.

The touch driving circuit 150 can drive a touch sensor implemented in the display panel 110.

The touch driving circuit 150 can detect a touch sensing signal resulting from a touch of a user on the display panel 110, and can output a sensing data based on the touch sensing signal.

The touch driving circuit 150 can be disposed separately from a circuit for the display driving. The touch driving circuit 150, in some cases, can be disposed to be integrated with the circuit for the display driving. For example, the touch driving circuit 150 can be disposed as a type to be integrated with the data driving circuit 130.

According to types (e.g., a size, or the like) of the touch display device 100, one touch driving circuit 150 can be included in the touch display device 100, or two or more touch driving circuit 150 can be included in the touch display device 100.

The touch controller 160 can control one or two or more touch driving circuit 150.

The touch controller 160 can detect a presence or an absence of a touch of a user and a touch coordinate on the display panel 100 based on the sensing data output by the touch driving circuit 150.

A touch sensor and a line driven by the touch driving circuit 150 can be positioned outside of the display panel 110, or can be disposed inside of the display panel 110, according to the touch display device 100.

In the case that the touch sensor is disposed inside of the display panel 110, the touch sensor can be implemented by using some of electrodes for the display driving. Alternatively, the touch sensor can be implemented by using electrodes disposed separately from electrodes for the display driving.

Figure 2:
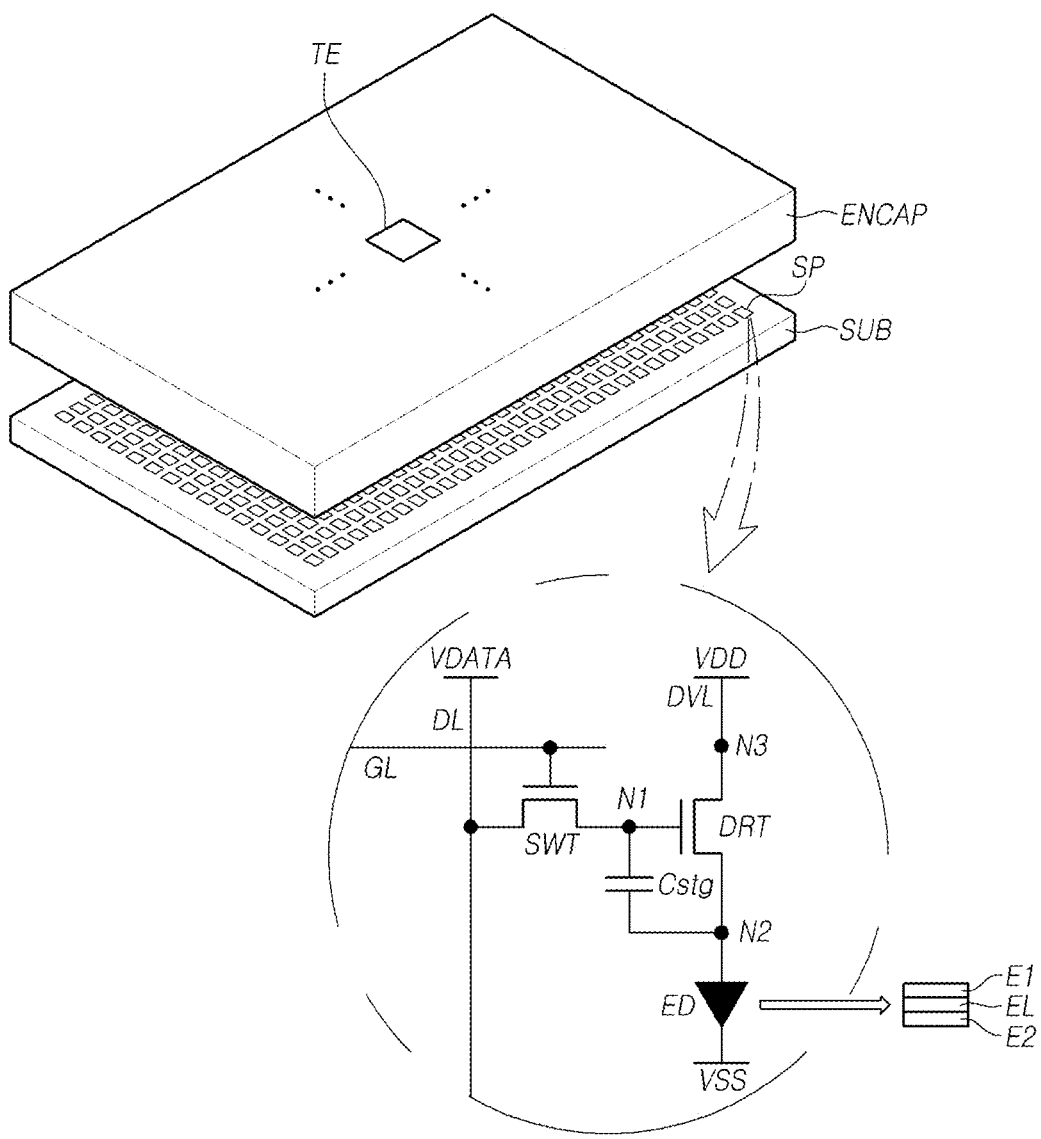
FIG. 2 is a diagram illustrating an example of a structure of a display panel according to some aspects of the present disclosure.

FIG. 2 is a diagram illustrating an example of a structure of the display panel 110 according to some aspects of the present disclosure.

FIG. 2 illustrates an example of a structure of the touch sensor disposed inside of the display panel 110.

The display panel 110 can include a substrate SUB on which the plurality of subpixels SP are disposed.

A light-emitting element ED and various circuit elements for a driving of the light-emitting element ED can be disposed on each of the plurality of subpixels SP.

For example, a driving transistor DRT supplying a driving current to the light-emitting element ED can be disposed on each of the plurality of subpixels SP. At least one switching transistor SWT controlling a driving timing of the driving transistor DRT and the light-emitting element ED can be disposed on the subpixel SP.

The switching transistor SWT can be controlled by a scan signal supplied to the gate line GL. The switching transistor SWT can control that the data voltage VDATA supplied through the data line DL is applied to a first node N1. The first node N1 can be a gate node of the driving transistor DRT.

The driving transistor DRT can be electrically connected between a second node N2 and a third node N3. The second node N2 can be a source node or a drain node of the driving transistor DRT. The third node N3 can be the drain node or the source node of the driving transistor DRT.

The driving transistor DRT can be electrically connected to the light-emitting element ED through the second node N2. The driving transistor DRT can be electrically connected to a driving voltage line DVL in which a first driving voltage VDD is supplied through the third node N3. The first driving voltage VDD, for example, can be a high potential driving voltage.

A storage capacitor Cstg can be electrically connected between the first node N1 and the second node N2. The storage capacitor Cstg can maintain the data voltage VDATA for one frame.

The above-described example illustrates a 2T1C structure where two transistors and one capacitor are disposed on the subpixel SP. According to subpixel SP, three or more transistors or two or more capacitors can be further disposed on the subpixel SP. Furthermore, the above-described example illustrates the case where all transistors disposed on the subpixel SP are N types, but in some cases, at least some of the transistors disposed on the subpixel SP can be a P type.

The data voltage VDATA can be applied to the first node N1 according to driving of the switching transistor SWT. The driving transistor DRT can supply a driving current corresponding to the data voltage VDATA to the light-emitting element ED. The light-emitting element ED can be driven according to the driving current and can represent a luminance according to the image data.

The light-emitting element ED, for example, can include a first electrode E1, a light-emitting layer EL and a second electrode E2.

The first electrode E1 of the light-emitting element ED can be electrically connected to the driving transistor DRT. The light-emitting layer EL of the light-emitting element ED can be made of a material emitting a light according to an electrical signal, for example, can be made of an organic material. The second electrode E2 of the light-emitting element ED can be electrically connected to a line in which a second driving voltage VSS is supplied. The second driving voltage VSS, for example, can be a low potential driving voltage.

For a protection of the light-emitting element ED, an encapsulation layer ENCAP can be disposed on the substrate SUB on which the light-emitting element ED and the various circuit elements are disposed.

The encapsulation layer ENCAP can seal the light-emitting element ED, and can prevent moisture and/or oxygen flowing from outside to the light-emitting element ED. The encapsulation layer ENCAP can include a plurality of layers. For example, the encapsulation layer ENCAP can include at least one organic layer and at least one inorganic layer.

A touch sensor structure can be implemented on the encapsulation layer ENCAP. For example, a plurality of touch electrodes TE can be disposed on the encapsulation layer ENCAP. As the touch electrode TE is disposed on the encapsulation layer ENCAP, the touch sensor structure can be disposed without affecting components and structure for the display driving.

The touch electrode TE can be directly disposed on the encapsulation layer ENCAP.

Alternatively, the touch electrode TE can be disposed on at least one insulating layer disposed on the encapsulation layer ENCAP. The insulating layer disposed on the encapsulation layer ENCAP can be an inorganic layer, or can be an organic layer.

In the case that the touch electrode TE disposed on the encapsulation layer ENCAP is implemented by using two or more metal layers, an insulating layer can be disposed between metal layers.

The touch driving circuit 150 can drive the touch electrode TE disposed on the encapsulation layer ENCAP and can perform the touch sensing.

The touch driving circuit 150, for example, can perform the touch sensing by detecting a change of a self-capacitance between a touch object (e.g., a finger, a pen) according to a touch of a user and the touch electrode TE.

Alternatively, the touch driving circuit 150 can perform the touch sensing by detecting a change of a mutual-capacitance between touch electrodes TE according to the touch of the user.

Figure 3:
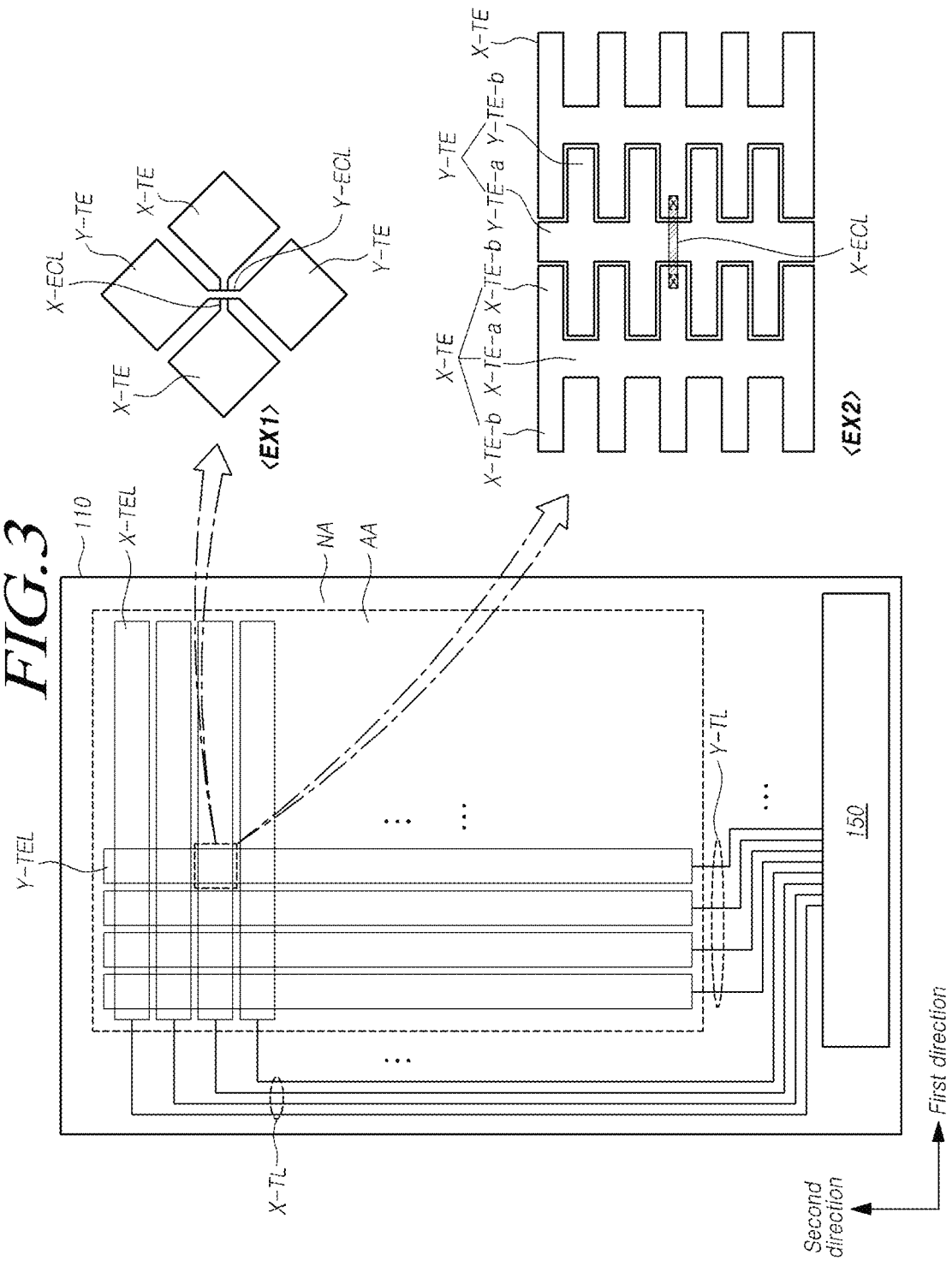
FIG. 3 is a diagram illustrating an example of a touch sensor structure included in a touch display device according to some aspects of the present disclosure.

FIG. 3 is a diagram illustrating an example of a touch sensor structure included in the touch display device 100 according to some aspects of the present disclosure.

FIG. 3 illustrates an example of where the touch sensor structure has a mutual-capacitance sensing structure.

A plurality of touch electrode lines TEL can be disposed on the active area AA of the display panel 110. The plurality of touch electrode lines TEL can include a plurality of X-touch electrode lines X-TEL disposed in a first direction and a plurality of Y-touch electrode lines Y-TEL disposed in a second direction crossing the first direction.

The X-touch electrode line X-TEL and the Y-touch electrode line Y-TEL can be disposed on different layers. Alternatively, the X-touch electrode line X-TEL and the Y-touch electrode line Y-TEL can be disposed on a same layer. In this case, on an area where the X-touch electrode line X-TEL and the Y-touch electrode line are crossing, a portion of one of two can be disposed on a different layer.

One of the X-touch electrode line X-TEL and the Y-touch electrode line Y-TEL can be a touch driving electrode to which a touch driving signal is applied. Another of the X-touch electrode line X-TEL and the Y-touch electrode line Y-TEL can be a touch sensing electrode from which a touch sensing signal is detected.

Each of the plurality of touch electrode lines TEL can include two or more touch electrodes TE and a touch electrode connecting pattern ECL connecting the touch electrodes TE each other.

For example, the X-touch electrode line X-TEL can include a plurality of X-touch electrodes X-TE and at least one X-touch electrode connecting pattern X-ECL. The Y-touch electrode line Y-TEL can include a plurality of Y-touch electrodes Y-TE and at least one Y-touch electrode connecting pattern Y-ECL.

The plurality of X-touch electrodes X-TE can be connected in the first direction by the X-touch electrode connecting pattern X-ECL. The plurality of Y-touch electrode Y-TE can be connected in the second direction by the Y-touch electrode connecting pattern Y-ECL.

Each of the plurality of X-touch electrode lines X-TEL can be electrically connected to the touch driving circuit 150 by an X-touch routing line X-TL. Each of the plurality of Y-touch electrode lines Y-TEL can be electrically connected to the touch driving circuit 150 by a Y-touch routing line Y-TL.

The X-touch routing line X-TL and the Y-touch routing line Y-TL can be disposed on the non-active area NA and can be electrically connected to the touch driving circuit 150.

A shape of the touch electrode TE included in the touch electrode line TEL can be various.

For example, such as an example illustrated in <EX 1> of FIG. 3, a shape of the touch electrode TE included in the touch electrode line TEL can be a rhombus shape. The touch electrode TE of the rhombus shape can be connected by the touch electrode connecting pattern ECL and can constitute the touch electrode line TEL.

For another example, such as an example illustrated in <EX 2> of FIG. 3, the touch electrode TE included in the touch electrode line TEL can be a shape including a body portion TE-a and a wing portion TE-b.

The touch electrode TE can include at least one body portion TE-a disposed in the second direction. The touch electrode TE can include a plurality of wing portions TE-b connected to the body portion TE-a and disposed in the first direction.

A body portion X-TE-a of the X-touch electrode X-TE and a body portion Y-TE-a of the Y-touch electrode Y-TE can be disposed alternately along the first direction. A wing portion X-TE-b of the X-touch electrode X-TE and a wing portion Y-TE-b of the Y-touch electrode Y-TE can be disposed alternately along the second direction.

The wing portion X-TE-b of the X-touch electrode X-TE and the wing portion Y-TE-b of the Y-touch electrode Y-TE can be disposed as an interdigitated form.

As a boundary area of the X-touch electrode X-TE and the Y-touch electrode Y-TE increases and a gap between the boundary areas reduces, a performance of the touch sensing based on a detection of a change of the mutual-capacitance between the X-touch electrode X-TE and the Y-touch electrode Y-TE can be improved.

The touch electrode TE can be made of a conductive material which is a transparent and/or has a high transmittance.

Alternatively, the touch electrode TE can be made of an opaque metal material. In this case, the touch electrode TE can include a plurality of opened portion positioned on an area corresponding to a light-emitting area of the subpixel SP disposed on the display panel 110.

Furthermore, a shape of the touch electrode TE and a material constituting the touch electrode TE is not limited to the above-described examples and instead can have different shapes and/or be made of different material so long as touch electrode TE is capable of providing the same touch sensing capabilities and functionalities.

Furthermore, the touch sensor structure disposed on the active area AA of the display panel 110 can be disposed as a divided shape for a constant area for reducing a load of the touch sensor.

FIGS. 4 to 9 are diagrams illustrating other examples of a touch sensor structure included in the touch display device 100 according to some aspects of the present disclosure.

Figure 4:
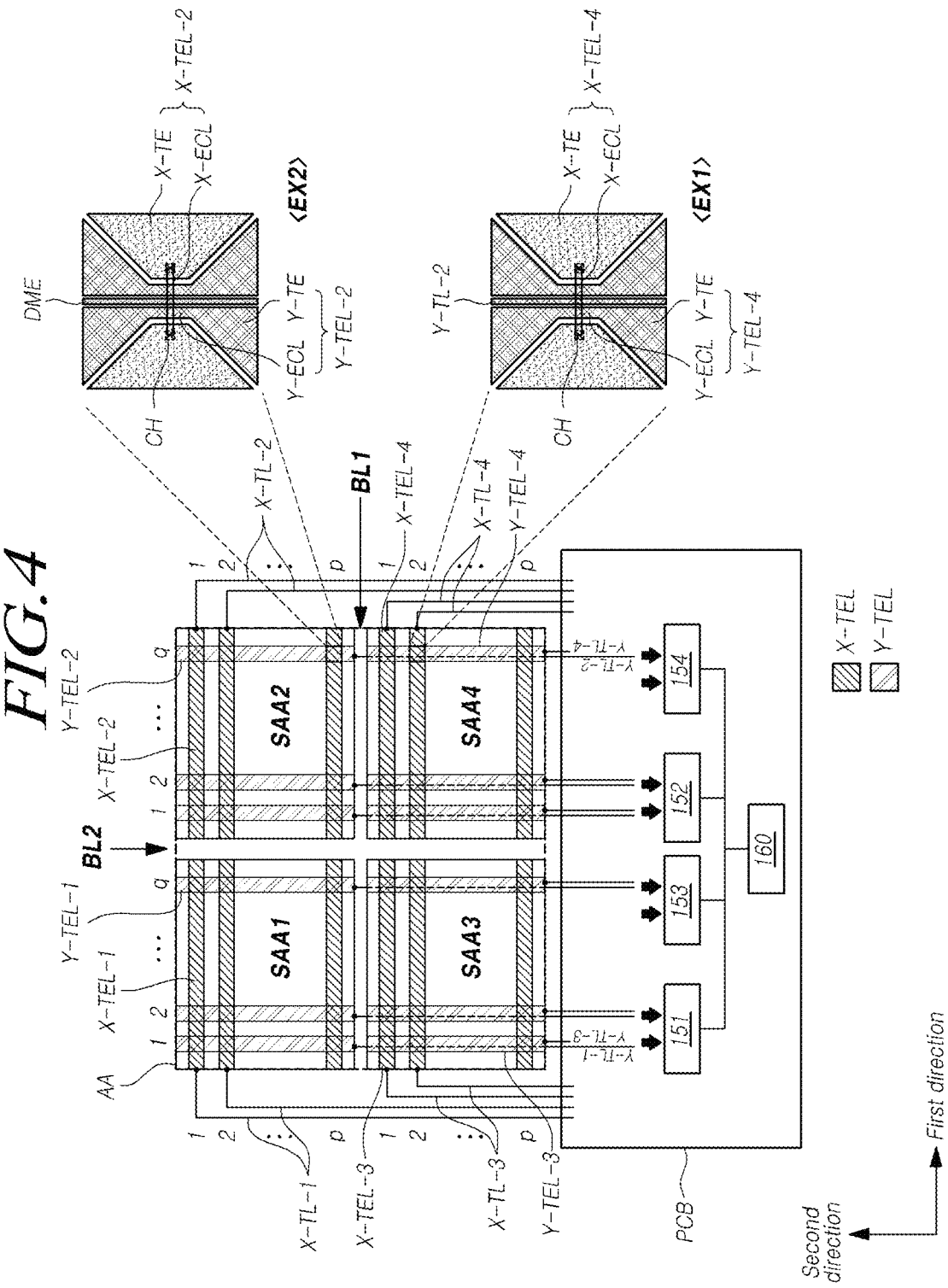
FIGS. 4 to 9 are diagrams illustrating examples of a touch sensor structure included in a touch display device according to some aspects of the present disclosure.

Referring to FIG. 4, the active area AA of the display panel 110 can include a plurality of sub-areas SAA. FIG. 4 illustrates an example that the active area AA includes four sub-areas SAA.

Four sub-areas SAA1, SAA2, SAA3, SAA4 can be divided by a boundary positioned inside of the active area AA.

For example, a first sub-area SAA1 and a third sub-area SAA3 can be divided by a first boundary BL1 in the first direction (e.g., horizontal direction). A second sub-area SAA2 and a fourth sub-area SAA4 can be divided by the first boundary BL1.

The first sub-area SAA1 and the second sub-area SAA2 can be divided by a second boundary BL2 in the second direction (e.g., vertical direction). The third sub-area SAA3 and the fourth sub-area SAA4 can be divided by the second boundary BL2.

The touch electrode lines TEL disposed on each of the four sub-areas SAA1, SAA2, SAA3, SAA4 can be disposed to be separated.

For example, p X-touch electrode lines X-TEL can be disposed on each sub-area SAA. Q Y-touch electrode lines Y-TEL can be disposed on each sub-area SAA. In an example described below, the X-touch electrode line X-TEL can be a touch driving electrode, and the Y-touch electrode line Y-TEL can be a touch sensing electrode, but the present disclosure is not limited thereto.

As the touch electrode lines TEL are disposed to be separated for each sub-area SA, a load of the touch electrode lines TEL can be reduced.

The touch electrode line TEL disposed on each sub-area SAA can be driven by a separate touch driving circuit 150.

For example, a first X-touch electrode line X-TEL-1 and a first Y-touch electrode line Y-TEL-1 disposed on the first sub-area SAA1 can be driven by a first touch driving circuit 151. A second X-touch electrode line X-TEL-2 and a second Y-touch electrode line Y-TEL-2 disposed on the second sub-area SAA2 can be driven by a second touch driving circuit 152. A third X-touch electrode line X-TEL-3 and a third Y-touch electrode line Y-TEL-3 disposed on the third sub-area SAA3 can be driven by a third touch driving circuit 153. A fourth X-touch electrode line X-TEL-4 and a fourth Y-touch electrode line Y-TEL-4 disposed on the fourth sub-area SAA4 can be driven by a fourth touch driving circuit 154.

In some cases, two or more sub-areas SAA can be driven by one touch driving circuit 150. For example, the first sub-area SAA1 and the second sub-area SAA2 can be driven by one touch driving circuit 150, and the third sub-area SAA3 and the fourth sub-area SAA4 can be driven by another touch driving circuit 150. Alternatively, the first sub-area SAA1 and the third sub-area SAA3 can be driven by one touch driving circuit 150, and the second sub-area SAA2 and the fourth sub-area SAA4 can be driven by another touch driving circuit 150.

Alternatively, the touch electrode lines TEL can be disposed to be separated for each sub-area SAA and the touch electrode lines TEL disposed on all sub-areas SAA can be driven by one touch driving circuit 150.

A plurality of touch driving circuits 151, 152, 153, 154 can be controlled by the touch controller 160. The touch driving circuit 150 and the touch controller 160, for example, can be disposed on a printed circuit board PCB, and can drive the touch electrode lines TEL positioned in the display panel 110.

The touch electrode lines TEL disposed on each sub-area SAA can be electrically connected to the touch driving circuit 150 by the touch routing line TL.

A part of the touch routing line TL can be disposed on the active area AA to be electrically connected to the touch electrode line TEL.

For example, the X-touch electrode lines X-TEL disposed on the first sub-area SAA1 and the third sub-area SAA3 can be electrically connected to the touch driving circuit 150 through the X-touch routing line X-TL disposed on one side of the active area AA. The X-touch electrode lines X-TEL disposed on the second sub-area SAA2 and the fourth sub-area SAA4 can be electrically connected to the touch driving circuit 150 through the X-touch routing line X-TL disposed on other side of the active area AA.

Each of the Y-touch electrode lines Y-TEL disposed on the first sub-area SAA1 and the second sub-area SAA2 can be electrically connected to the touch driving circuit 150 by the Y-touch routing line Y-TL disposed on the third sub-area SAA3 and the fourth sub-area SAA4.

The Y-touch electrode lines Y-TEL disposed on the third sub-area SAA3 and the fourth sub-area SAA4 can be electrically connected to the touch driving circuit 150 by the Y-touch routing line Y-TL positioned outside of the active area AA.

In one example, because the Y-touch routing line Y-TL that is connected to the Y-touch electrode line Y-TEL disposed on the first sub-area SAA1 and the second sub-area SAA2, is disposed on the third sub-area SAA3 and the fourth sub-area SAA4, each of which is a part of the active area AA, the non-active area NA required for an arrangement of the Y-touch routing line Y-TL can be reduced.

An increase of the non-active area NA according to an arrangement of the touch routing line TL can be prevented, and the touch sensor structure where the touch electrode lines TEL are disposed to be separated for the plurality of sub-areas SAA can be implemented.

The touch routing line TL disposed on the active area AA can be positioned on an area surrounding the touch electrode line TEL that is electrically separated.

For example, referring to an example illustrated in <EX 1> of FIG. 4, the fourth X-touch electrode line X-TEL-4 and the fourth Y-touch electrode line Y-TEL-4 can be disposed to be crossed on the fourth sub-area SAA4.

The fourth X-touch electrode line X-TEL-4 can include the plurality of X-touch electrodes X-TE with the X-touch electrode connecting pattern X-ECL connecting the X-touch electrodes X-TE. The X-touch electrode connecting pattern X-ECL, for example, can be disposed on a different layer than the X-touch electrode X-TE. The X-touch electrode connecting pattern X-ECL can be electrically connected to the X-touch electrode X-TE through a contact hole CH.

The fourth Y-touch electrode line Y-TEL-4 can include the plurality of Y-touch electrodes Y-TE with the Y-touch electrode connecting pattern Y-ECL connecting the Y-touch electrodes Y-TE. The Y-touch electrode connecting pattern Y-ECL, for example, can be disposed on a same layer with the Y-touch electrode Y-TE.

The second Y-touch routing line Y-TL-2 electrically connected to the second Y-touch electrode line Y-TEL-2 disposed on the second sub-area SAA2 can be disposed on the fourth sub-area SAA4. The fourth Y-touch electrode line Y-TEL-4 disposed on the fourth sub-area SAA4 can be disposed to be separated into two parts due to an arrangement of the second Y-touch routing line Y-TL-2.

The second Y-touch routing line Y-TL-2 can be positioned on an area surrounding the fourth Y-touch electrode line Y-TEL-4. The second Y-touch routing line Y-TL-2 can be disposed on a same layer with the fourth Y-touch electrode line Y-TEL-4. The two parts into which the fourth Y-touch electrode line Y-TEL-4 may be separated, can be electrically connected on at least one point by a connecting pattern disposed on a same layer with the X-touch electrode connecting pattern X-ECL.

Similarly, a part of the first Y-touch routing line Y-TL-1 electrically connected to the first Y-touch electrode line Y-TEL-1 disposed on the first sub-area SAA1 can be disposed on the third sub-area SAA3.

Because each of the first Y-touch routing line Y-TL-1 and the second Y-touch routing line Y-TL-2 is disposed on the third sub-area SAA3 and the fourth sub-area SAA4, even when the number of the touch routing line TL increases due to the touch electrode lines TEL being divided for the plurality of sub-areas SAA, increases in an area where the touch routing line TL is disposed on the non-active area NA, can be minimized.

Furthermore, for preventing a deviation in touch sensitivity due to an arrangement of the touch routing line TL on the active area AA, a dummy electrode DME can be disposed on a part area corresponding to an area where the touch routing line TL is disposed.

For example, as illustrated in <EX 2> of FIG. 4, the second X-touch electrode line X-TEL-2 and the second Y-touch electrode line Y-TEL-2 can be disposed to be crossed on the second sub-area SAA2. The second Y-touch electrode line Y-TEL-2 can be electrically connected to the second Y-touch routing line Y-TL-2 disposed on the fourth sub-area SAA4.

On the second sub-area SAA2, at least one dummy electrode DME can be disposed on an area corresponding to an area where the second Y-touch routing line Y-TL-2 is disposed on the fourth sub-area SAA4.

The dummy electrode DME, for example, can be disposed on an area surrounding the second Y-touch electrode line Y-TEL-2. The dummy electrode DME can be disposed to be separated from the second Y-touch electrode line Y-TEL-2. The dummy electrode DME can be floated.

A width of an area where the dummy electrode DME is disposed can be identical or similar to a width where the second Y-touch routing line Y-TL-2 is disposed on the fourth sub-area SAA4. An area of the second Y-touch electrode line Y-TEL-2 can be identical or similar to an area of the fourth Y-touch electrode line Y-TEL-4 due to an arrangement of the dummy electrode DME.

Even though the second Y-touch routing line Y-TL-2 is disposed on the fourth sub-area SAA4, due to an arrangement of the dummy electrode DME, a deviation in touch sensitivity, due to a difference of areas of the touch electrode lines TEL disposed on the second sub-area SAA2 and the fourth sub-area SAA4, can be prevented.

Furthermore, embodiments of the present disclosure can provide the touch sensor structure that reduce a load on the display panel 110 having a larger area by dividing the active area AA into a larger number of sub-areas SAA (e.g., more than 4 sub-areas described above) and arranging the touch electrode lines TEL to be separated for each sub-area SAA.

Figure 5:
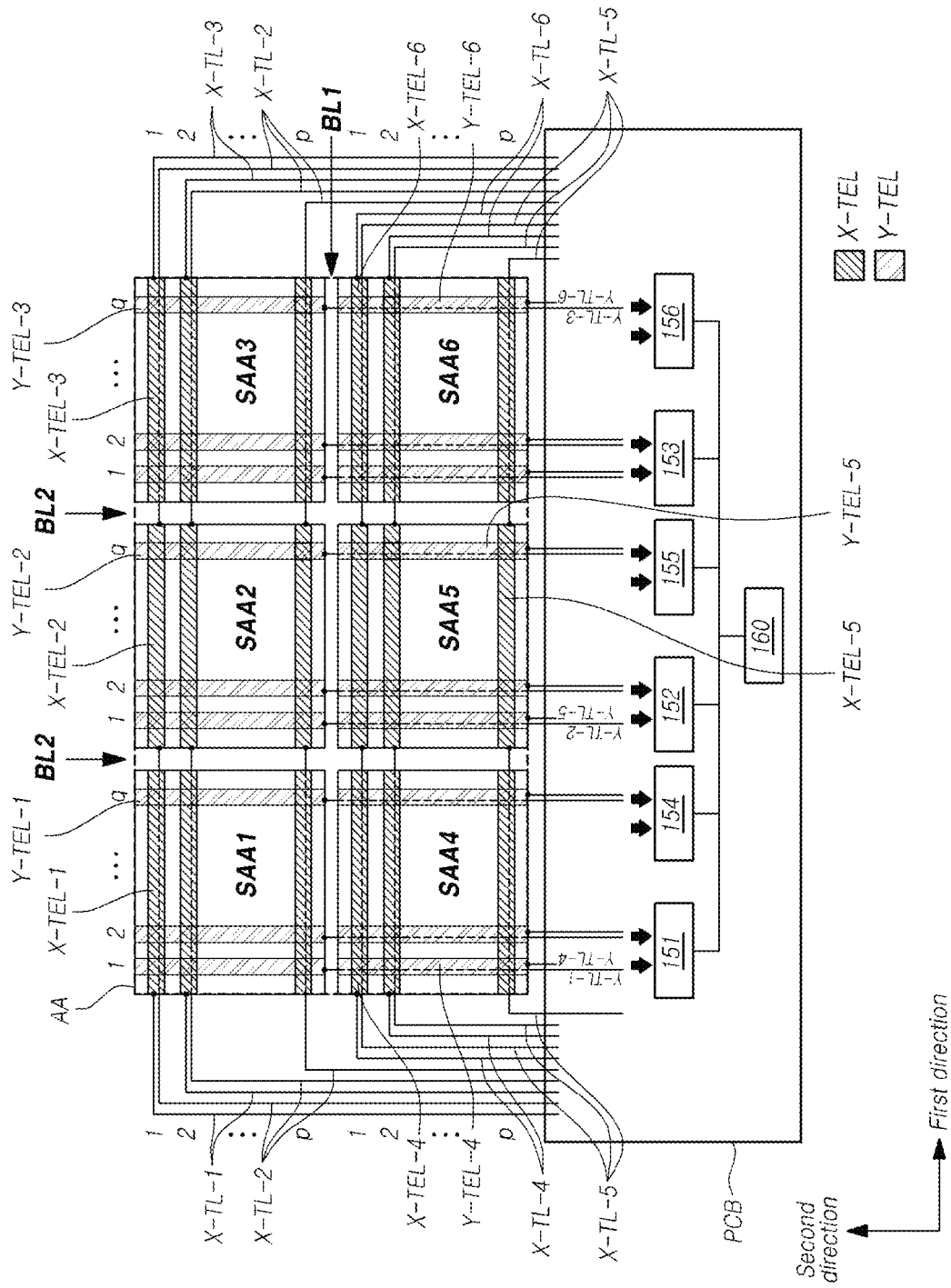

Referring to FIG. 5, the active area AA, for example, can be divided as 6 sub-areas SAA1, SAA2, SAA3, SAA4, SAA5, SAA6, according to some aspects of the present disclosure.

The plurality of touch electrode lines TEL can be disposed to be separated into 6 example sub-areas SAA1, SAA2, SAA3, SAA4, SAA5, SAA6. The touch electrode lines TEL disposed on each of the 6 sub-areas SAA1, SAA2, SAA3, SAA4, SAA5, SAA6 can be driven by 6 touch driving circuits 151, 152, 153, 154, 155, 156. Alternatively, in some cases, the touch electrode lines TEL disposed on two or more sub-areas can be driven by same touch driving circuit 150.

A part of the touch routing line TL electrically connected to the touch electrode line TEL can be disposed on the active area AA.

For example, similar to the example illustrated in FIG. 4, the Y-touch electrode lines Y-TEL disposed on each of a first sub-area SAA1, a second sub-area SAA2 and a third sub-area SAA3 can be electrically connected to the Y-touch routing lines Y-TL disposed on each of a fourth sub-area SAA4, a fifth sub-area SAA5 and a sixth sub-area SAA6.

The dummy electrode DME can be disposed on a part area of the first sub-area SAA1, the second sub-area SAA2 and the third sub-area SAA3 corresponding to an area where the Y-touch routing lines Y-TL are disposed on the fourth sub-area SAA4, the fifth sub-area SAA5 and the sixth sub-area SAA6.

Furthermore, a part of the X-touch routing line X-TL can be disposed on the active area AA.

For example, in the present disclosure, the first sub-area SAA1 and the fourth sub-area SAA4 may be positioned on one side of the active area AA (e.g., left side) and may have a boundary adjacent to a boundary of one side (e.g., left side) of the active area AA. The first sub-area SAA1 and the fourth sub-area SAA4 may be referred to as a boundary sub-area (or alternatively the left boundary sub-area). Similarly, the third sub-area SAA3 and the sixth sub-area SAA6 may be positioned on the other side of the active area AA (e.g., right side) and may have a boundary adjacent to a boundary of other side (e.g., right side) of the active area AA. The first sub-area SAA1 and the fourth sub-area SAA4 may be referred to as a boundary sub-area (or alternatively the right boundary sub-area). The left boundary sub-area and the right boundary sub-area may collectively be referred to as the boundary sub-area. Reference to boundary sub-area hereinafter may encompass either the left boundary sub-area, the right boundary sub-area or both.

The second sub-area SAA2 and the fifth sub-area SAA5 positioned between two boundary sub-areas may be referred as a central sub-area.

The X-touch electrode line X-TEL disposed on the boundary sub-area can be electrically connected to the touch driving circuit 150 through the X-touch routing line X-TL disposed on the non-active area NA.

A part of the X-touch routing line X-TL electrically connected to the X-touch electrode line X-TEL disposed on the central sub-area can be disposed on the boundary sub-area.

For example, a part of a second X-touch routing line X-TL-2 electrically connected to a second X-touch electrode line X-TEL-2 disposed on the second sub-area SAA2 can be disposed on at least one of sub-areas SAA positioned on both sides of the second sub-area SAA2. A part of the second X-touch routing line X-TL-2 can be disposed on at least one of the first sub-area SAA1 or the third sub-area SAA3.

A fifth X-touch routing line X-TL-5 electrically connected to a fifth X-touch electrode line X-TEL-5 disposed on the fifth sub-area SAA5 can be disposed on at least one of the fourth sub-area SAA4 or the sixth sub-area SAA6.

Furthermore, the X-touch electrode line X-TEL disposed on the central sub-area can be electrically connected to two or more X-touch routing lines X-TL disposed on the boundary sub-areas of both sides of the central sub-area.

For example, the second X-touch electrode line X-TEL-2 disposed on the second sub-area SAA2 can be electrically connected to the touch driving circuit 150 through the second X-touch routing line X-TL-2 disposed on the first sub-area SAA1 and the second X-touch routing line X-TL-2 disposed on the third sub-area SAA3.

The fifth X-touch electrode line X-TEL-5 disposed on the fifth sub-area SAA5 can be electrically connected to the touch driving circuit 150 through the fifth X-touch routing line X-TL-5 disposed on the fourth sub-area SAA4 and the fifth X-touch routing line X-TL-5 disposed on the sixth sub-area SAA6.

The number of the X-touch routing lines X-TL electrically connected to each of the X-touch electrode lines X-TEL disposed on the central sub-area can be greater than the number of the X-touch routing lines X-TL electrically connected to each of the X-touch electrode lines X-TEL disposed on the boundary sub-area.

The X-touch electrode lines X-TEL disposed on the central sub-area along a length of the X-touch routing line X-TL connecting the X-touch electrode line X-TEL and the touch driving circuit 150 can be driven by a double feeding method and thus a load of the X-touch electrode line X-TEL can be reduced. Accordingly, a deviation in touch sensing due to a load difference between the central sub-area and the boundary sub-area can be prevented.

Furthermore, a width of the X-touch routing line X-TL connected to the X-touch electrode line X-TEL disposed on the central sub-area can be different from a width of the X-touch routing line X-TL connected to the X-touch electrode line X-TEL disposed on the boundary sub-area.

In one example, on the non-active area NA, a width of the X-touch routing line X-TL connected to the X-touch electrode line X-TEL of the central sub-area can be greater than a width of the X-touch routing line X-TL connected to the X-touch electrode line X-TEL of the boundary sub-area. The X-touch routing line X-TL having a large width and the X-touch routing line X-TL having a small width can be disposed alternately on the non-active area NA.

By increasing at least one of the number or the width of the X-touch routing lines X-TL connected to the X-touch electrode lines X-TEL disposed on the central sub-area, a load of the X-touch electrode lines X-TEL disposed on the central sub-area can be reduced.

Furthermore, the X-touch electrode lines X-TEL disposed on the central sub-area can be disposed as a separated structure in the central sub-area.

Figure 6:
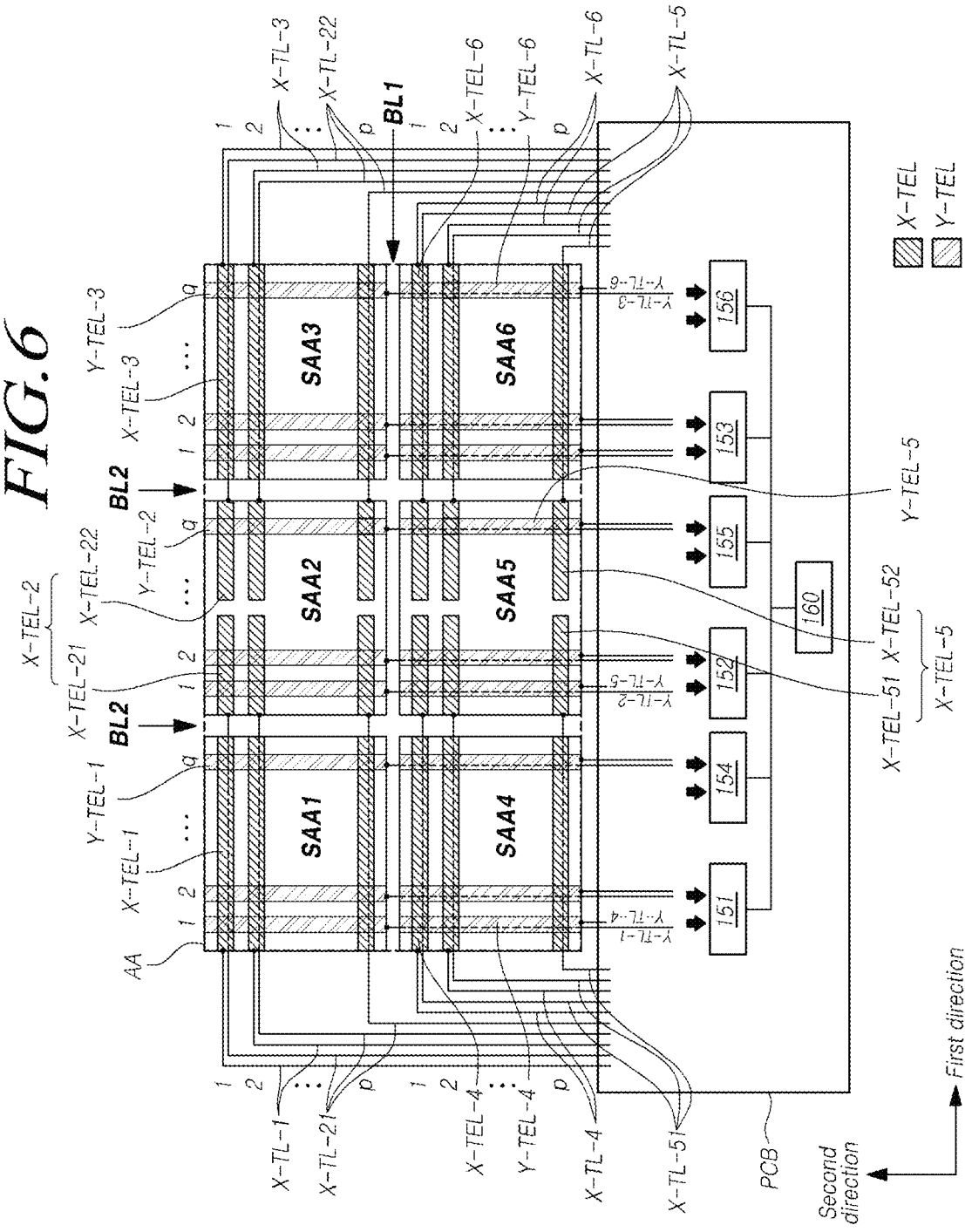

Referring to FIG. 6, the X-touch electrode line X-TEL disposed on the central sub-area can be separated into two parts.

For example, the second X-touch electrode line X-TEL-2 disposed on the second sub-area SAA2 can be separated into a first portion X-TEL-21 and a second portion X-TEL-22. The fifth X-touch electrode line X-TEL-5 disposed on the fifth sub-area SAA5 can be separated into a first portion X-TEL-51 and a second portion X-TEL-52.

The second X-touch routing line X-TL-21 electrically connected to the first portion X-TEL-21 of the second X-touch electrode line X-TEL-2 can be disposed on the first sub-area SAA1. The second X-touch routing line X-TL-22 electrically connected to the second portion X-TEL-22 of the second X-touch electrode line X-TEL-2 can be disposed on the third sub-area SAA3.

The second X-touch routing lines X-TL-21, X-TL-22 electrically connected to each of the first portion X-TEL-21 and the second portion X-TEL-22 of the second X-touch electrode line X-TEL-2 can be different.

The fifth X-touch routing lines X-TL-51, X-TL-52 electrically connected to each of the first portion X-TEL-51 and the second portion X-TEL-52 of the fifth X-touch electrode line X-TEL-5 can be different.

As the X-touch electrode line X-TEL positioned on the central sub-area is divided into two parts driven by separate X-touch routing lines X-TL, a load of the X-touch electrode line X-TEL disposed on the central sub-area can be reduced.

Furthermore, with a size of the central sub-area smaller than a size of the boundary sub-area, a load of the touch electrode line TEL disposed on the central sub-area can be reduced.

Figure 7:
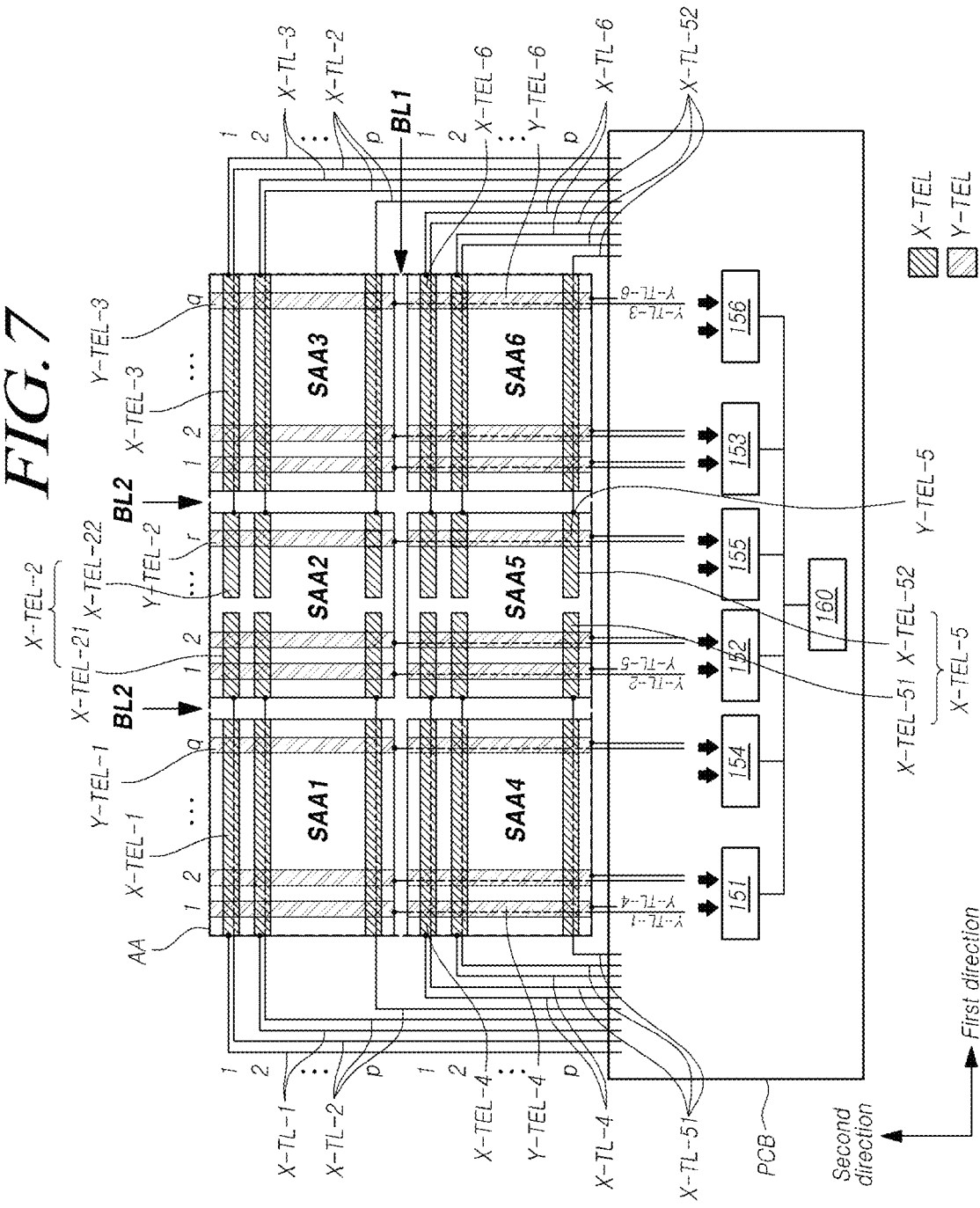

Referring to FIG. 7, p X-touch electrode lines X-TEL and q Y-touch electrode lines Y-TEL can be disposed on each of the boundary sub-areas.

P X-touch electrode lines X-TEL and r Y-touch electrode lines Y-TEL can be disposed on each of the central sub-areas. FIG. 7 illustrates an example that p X-touch electrode lines X-TEL are divided as two parts, but the X-touch electrode lines X-TEL can be disposed not to be divided.

R which is the number of the Y-touch electrode lines Y-TEL disposed on the central sub-area can be smaller than q which is the number of the Y-touch electrode lines Y-TEL disposed on the boundary sub-area. The number of channels driving the touch electrode lines TEL of the central sub-area can be smaller than the number of channels driving the touch electrode lines TEL of the boundary sub-area.

The number of the X-touch electrode lines X-TEL disposed on the central sub-area can be identical to the number of the X-touch electrode lines X-TEL disposed on the boundary sub-area, and the number of the Y-touch electrode lines Y-TEL disposed on the central sub-area can be smaller than the number of the Y-touch electrode lines Y-TEL disposed on the boundary sub-area.

An area or a width of the central sub-area can be smaller than an area or a width of the boundary sub-area. Specifically, an entire area of the touch electrode lines TEL disposed on the central sub-area can be smaller than an entire area of the touch electrode lines TEL disposed on the boundary sub-area.

In a structure that the touch electrode lines TEL are disposed to be separated for the sub-areas which are more than 4, a deviation between a load of the touch sensor structure disposed on the central sub-area along a length of the touch routing line TL connected to the touch electrode line TEL is the greatest and a load of the touch sensor structure disposed on the boundary sub-area can be reduced.

Furthermore, by using the structure with a reduced number of the channels of the central sub-area, the touch electrode lines TEL of the central sub-area can be driven by a double feeding, or a load of the touch sensor structure disposed on the central sub-area can be reduced even though it is difficult to separate the touch electrode lines TEL.

Figure 8:
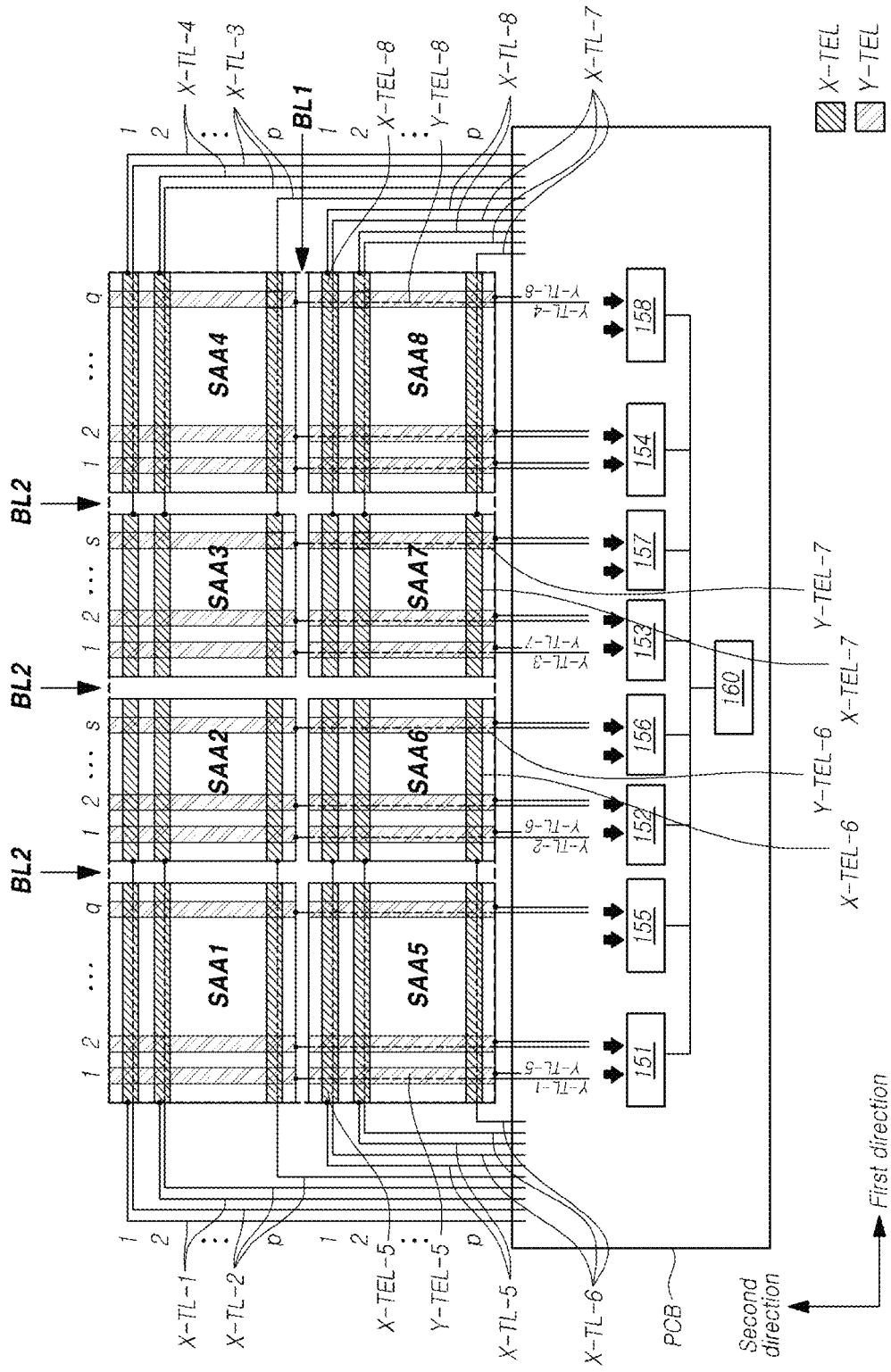

FIG. 8 illustrates an example of a structure with the active area AA being divided into 8 sub-areas SAA1, SAA2, SAA3, SAA4, SAA5, SAA6, SAA7, SAAB, according to some aspects of the present disclosure.

The X-touch electrode line X-TEL and the Y-touch electrode line Y-TEL disposed on the boundary sub-area can be electrically connected to the touch routing line TL as a similar structure with above-mentioned example (e.g., examples described with reference to FIGS. 6 and 7). The Y-touch electrode line Y-TEL disposed on the central sub-area can be electrically connected to the touch routing line TL as a similar structure with above-mentioned example (e.g., examples described with reference to FIGS. 6 and 7).

A second X-touch electrode line X-TEL-2 disposed on a second sub-area SAA2 of the central sub-area can be electrically connected to a second X-touch routing line X-TL-2 disposed on a first sub-area SAA1. A third X-touch electrode line X-TEL-3 disposed on a third sub-area SAA3 can be electrically connected to a third X-touch routing line X-TL-3 disposed on a fourth sub-area SAA4.

A sixth X-touch electrode line X-TEL-6 of a sixth sub-area SAA6 can be electrically connected to a sixth X-touch routing line X-TL-6 disposed on a fifth sub-area SAA5. A seventh X-touch electrode line X-TEL-7 of a seventh sub-area SAA7 can be electrically connected to a seventh X-touch routing line X-TL-7 disposed on an eighth sub-area SAA8.

The number of channels of the second sub-area SAA2, the third sub-area SAA3, the sixth sub-area SAA6 and the seventh sub-area SAA7 which are the central sub-areas can be smaller than the number of the channels of the first sub-area SAA1, the fourth sub-area SAA4, the fifth sub-area SAA5 and the eighth sub-area SAA8 which are the boundary sub-areas.

For example, the number of the X-touch electrode lines X-TEL disposed on the central sub-area can be identical to the number of the X-touch electrode lines X-TEL disposed on the boundary sub-area. S which is the number of the Y-touch electrode lines Y-TEL disposed on the central sub-area can be smaller than q which is the number of the Y-touch electrode lines Y-TEL disposed on the boundary sub-area.

An area or a width of the central sub-area can be smaller than an area or a width of the boundary sub-area.

In a structure where two or more central sub-areas are positioned between the boundary sub-areas, the number of the channels of the central sub-area can be made smaller than the number of the channels of the boundary sub-area. Hence, a load of the central sub-area can be reduced and a load deviation between the touch sensor structures disposed on each of the central sub-area and the boundary sub-area can be prevented.

Furthermore, in a case that the number of the sub-areas SAA included in the active area AA increases, the touch driving circuit 150 can be positioned on both sides of the active area AA to drive the touch electrode lines TEL.

Figure 9:
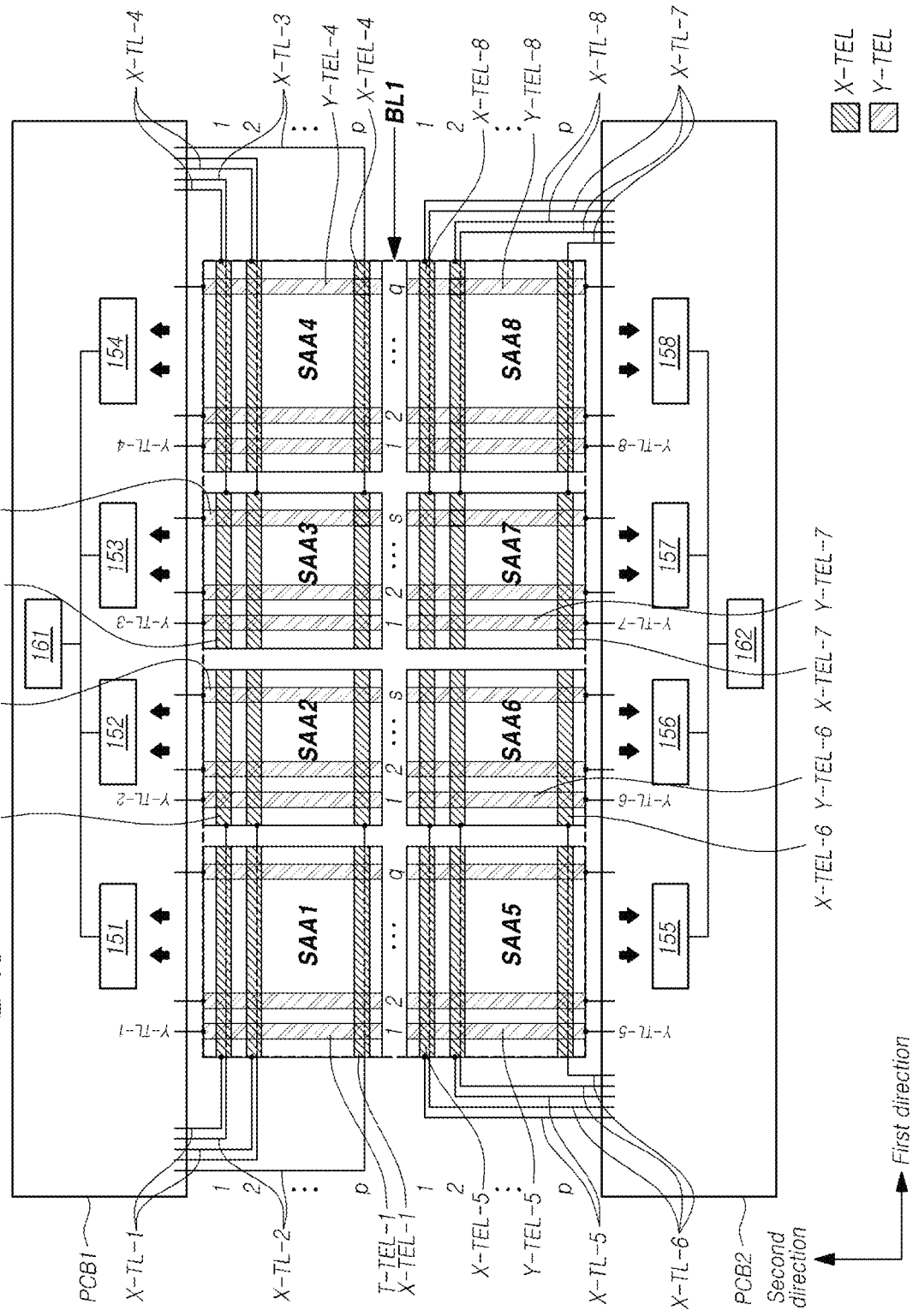

Referring to FIG. 9, a first printed circuit board PCB1 and a second printed circuit board PCB2 can be positioned on both sides of the active area AA.

The touch electrode lines TEL disposed on the first sub-area SAA1, the second sub-area SAA2, the third sub-area SAA3 and the fourth sub-area SAA4 of the plurality of sub-areas SAA can be driven by the touch driving circuits 151, 152, 153, 154 and a first touch controller 161 disposed on the first printed circuit board PCB1.

The touch electrode lines TEL disposed on the fifth sub-area SAA5, the sixth sub-area SAA6, the seventh sub-area SAA7 and the eighth sub-area SAA8 can be driven by the touch driving circuit 155, 156, 157, 158 and a second touch controller 162 disposed on the second printed circuit board PCB2.

As the touch electrode lines TEL of the sub-areas SAA positioned on an upper side of the active area AA are connected to the touch driving circuits 150 positioned on the upper side of the active area AA, a length and a load of the touch routing lines TL can be reduced.

By making that the number of the channels of the central sub-area smaller than the number of the channels of the boundary sub-area, a load of the central sub-area can be reduced.

Furthermore, an example illustrated in FIG. 9 represents the case where the first printed circuit board PCB1 and the second printed circuit board PCB2 are positioned on the upper side and a lower side of the active area AA. However, the first printed circuit board PCB1 and the second printed circuit board PCB2 can be positioned on a left side and a right side of the active area AA.

In this case, the first sub-area SAA1, the second sub-area SAA2, the fifth sub-area SAA5 and the sixth sub-area SAA6 can be driven by the touch driving circuit 150 disposed on one printed circuit board PCB (e.g., PCB1). The third sub-area SAA3, the fourth sub-area SAA4, the seventh sub-area SAA7 and the eighth sub-area SAA8 can be driven by the touch driving circuit 150 disposed on another printed circuit board PCB (e.g., PCB2).

Furthermore, in addition to above examples, the plurality of sub-areas SAA can be divided into different structures having varying shape and sizes based on a shape and a size of the active area AA. According to the structure that the plurality of sub-areas SAA are divided, a connection structure between the touch driving circuit 150 and the touch electrode line TEL disposed on the sub-area SAA can be different. An area on which the printed circuit board PCB is positioned can vary according to the various connection structure between the touch driving circuit 150 and the sub-area SAA.

As described above, even in the case that the touch sensor structure is implemented by the active area AA being divided into the plurality of sub-areas SAA, an entire load of the touch sensor structure and a load deviation between areas can be reduced and a performance of the touch sensing can be improved.

FIGS. 10 to 15 are diagrams illustrating examples of a specific shape of a touch sensor structure included in the touch display device 100 according to some aspects of the present disclosure.

Figure 10:
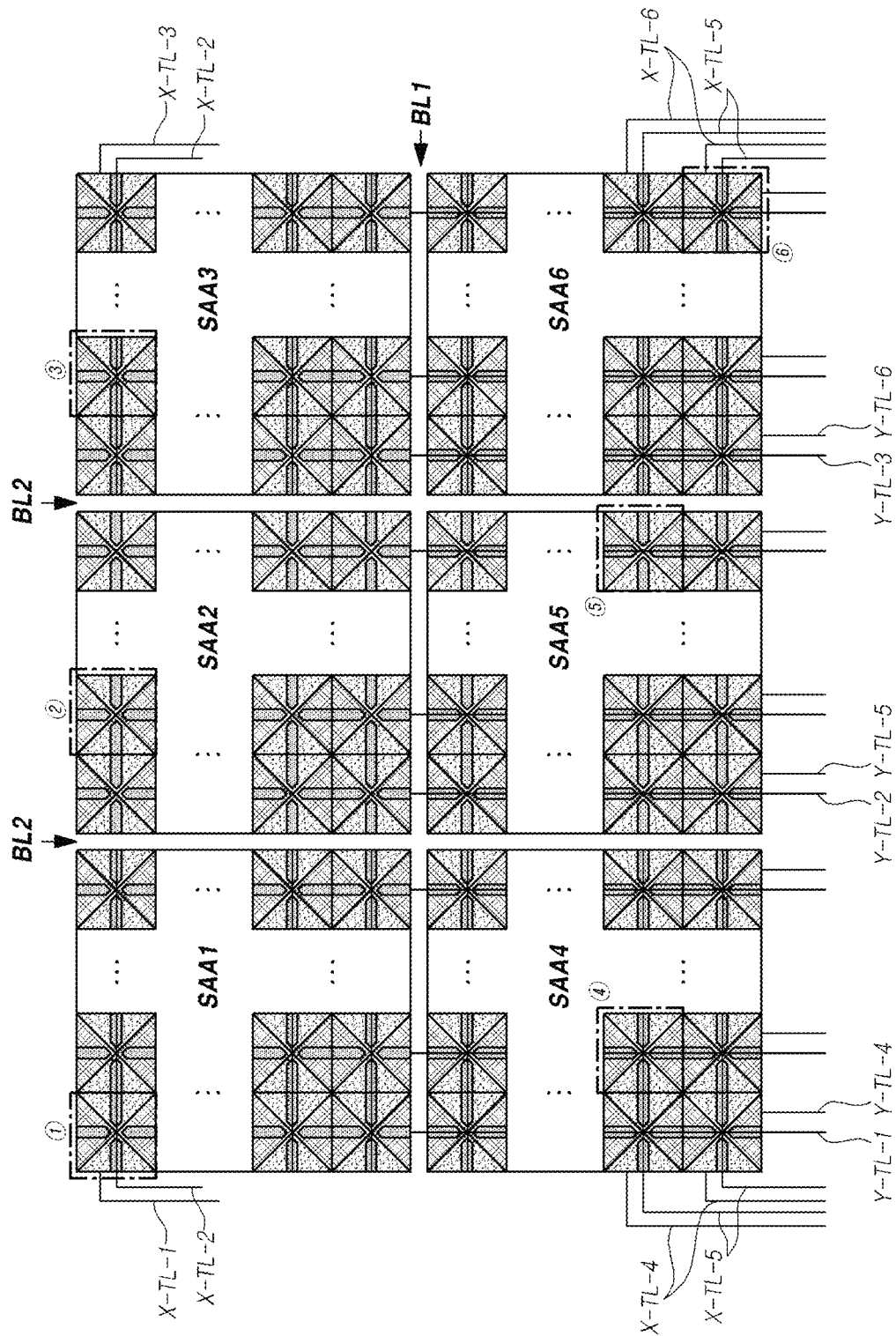
FIGS. 10 to 15 are diagrams illustrating examples of different shapes of a touch sensor structure included in a touch display device according to some aspects of the present disclosure.

Referring to FIG. 10, the active area AA can be divided as 6 sub-areas SAA1, SAA2, SAA3, SAA4, SAA5, SAA6 by one first boundary BL1 and two second boundary BL2.

The touch electrode lines TEL disposed on each of the six sub-areas SAA1, SAA2, SAA3, SAA4, SAA5, SAA6 can be separated.

FIG. 10 illustrates an example case where the touch electrode TE included in the touch electrode line TEL has a rhombus shape, but the present disclosure can be applied to other formations such as, for example, the touch electrode TE having a shape with the body portion TE-a and the wing portion TE-b or any other shape.

Some of the touch routing lines TL connected to the touch electrode line TEL can be positioned in the sub-areas SAA.

For example, the second X-touch routing line X-TL-2 electrically connected to the second X-touch electrode line X-TEL-2 disposed on the second sub-area SAA2, which is the central sub-area, can be disposed on at least one of the first sub-area SAA1 or the third sub-area SAA3.

The fifth X-touch routing line X-TL-5 electrically connected to the fifth X-touch electrode line X-TEL-5 disposed on the fifth sub-area SAA5, which is the central sub-area, can be disposed on at least one of the fourth sub-area SAA4 or the sixth sub-area SAA6.

Furthermore, some of the Y-touch routing lines Y-TL can be positioned in the sub-areas SAA.

For example, the second Y-touch routing line Y-TL-2 electrically connected to the second Y-touch electrode line Y-TEL-2 disposed on the second sub-area SAA2, which is the central sub-area, can be disposed on the fifth sub-area SAA5.

The first Y-touch routing line Y-TL-1 electrically connected to the first Y-touch electrode line Y-TEL-1 disposed on the first sub-area SAA1, which is the boundary sub-area, can be disposed on the fourth sub-area SAA4. The third Y-touch routing line Y-TL-3 electrically connected to the third Y-touch electrode line Y-TEL-3 disposed on the third sub-area SAA3, which is the boundary sub-area, can be disposed on the sixth sub-area SAA6.

As some or a portion of the touch routing lines TL are positioned in the sub-area SAA, in the structure that the touch electrode lines TEL are disposed to be separated for the plurality of sub-areas SAA, increases in an area of the non-active area NA increases due to an increase of the touch routing line TL, can be minimized.

As some or a portion of the touch routing lines TL are positioned in the sub-areas SAA, the touch routing line TL and the touch electrode line TEL, which are electrically separated from each other, can be positioned adjacent to one another. Furthermore, the touch routing lines TL connected to different touch electrode lines TEL can cross each other.

Figure 11:
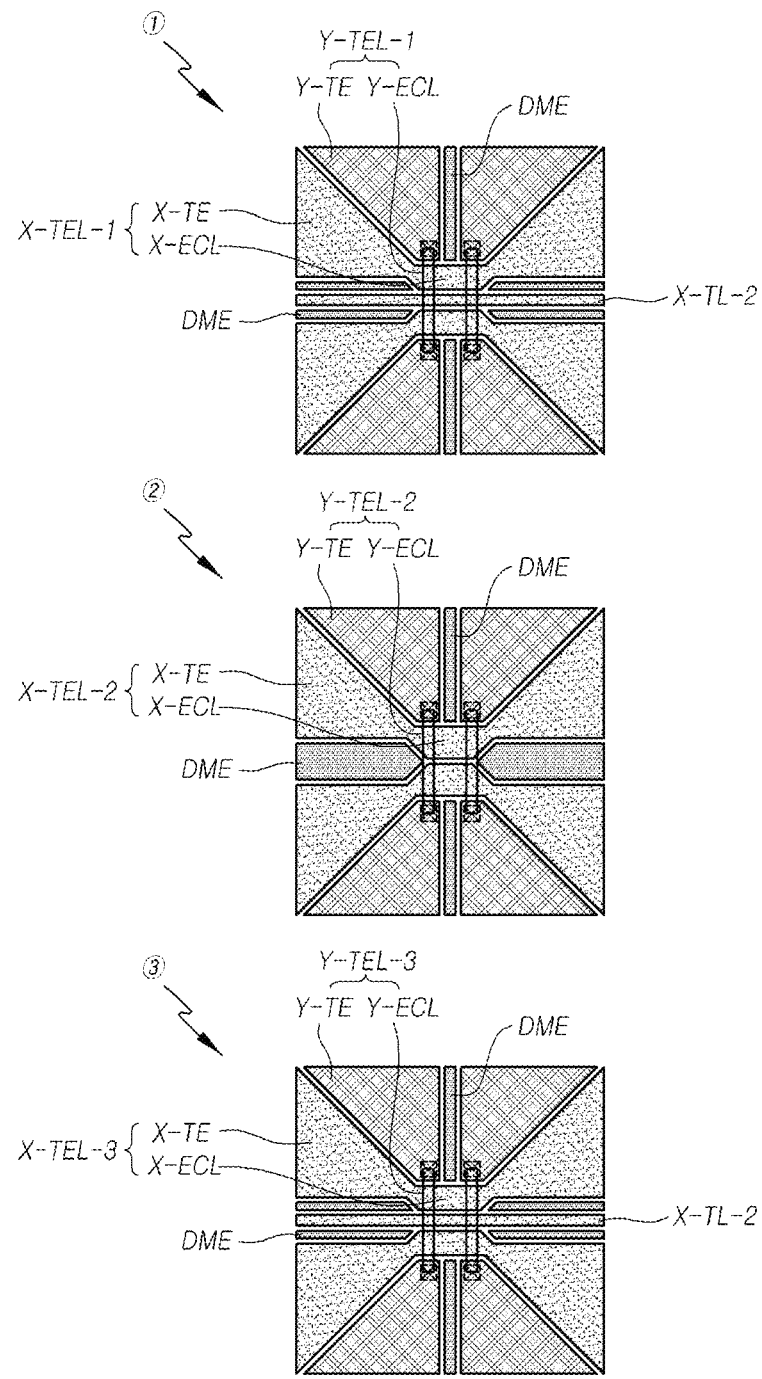
Figure 12:
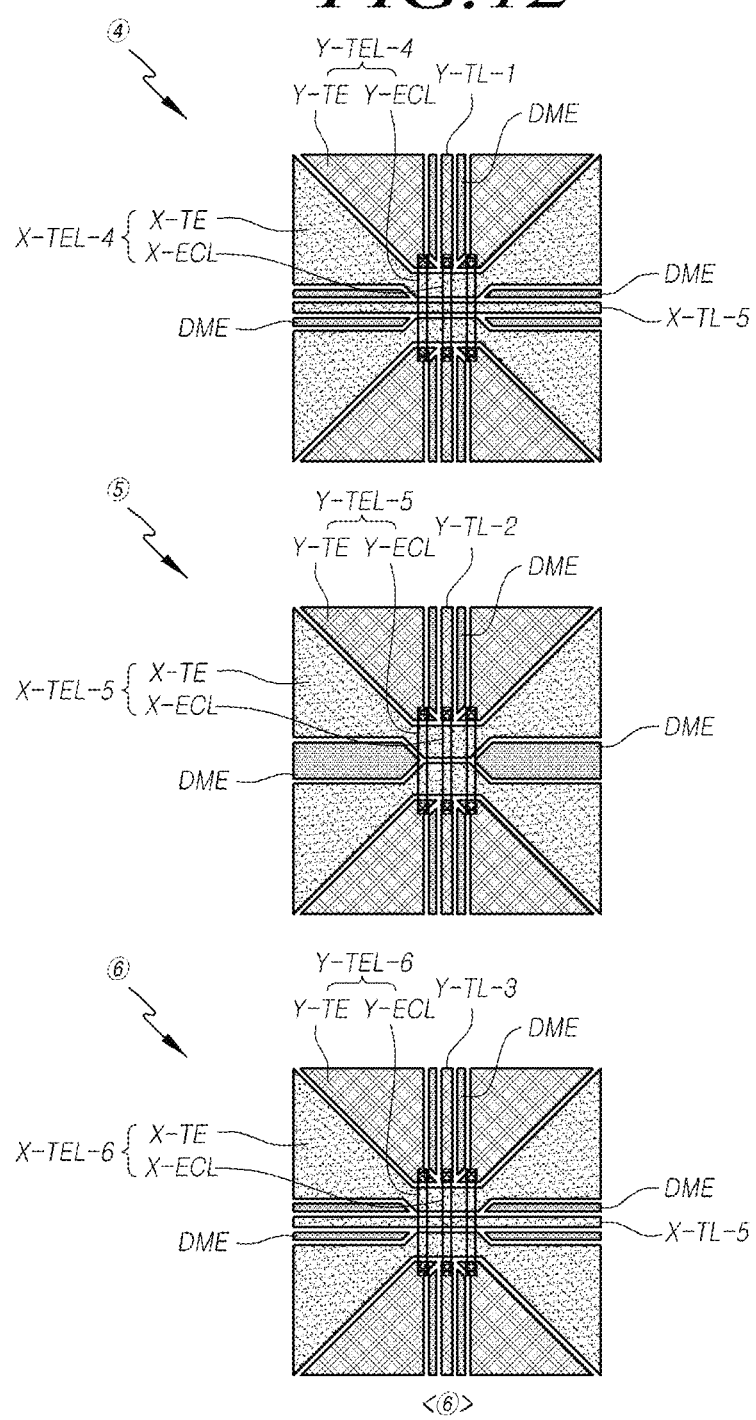

FIGS. 11 and 12 illustrate examples of a structure where an electrode and a line are disposed on a unit sensor area indicated by ①, ②, ③, ④, ⑤, ⑥ illustrated in FIG. 10.

Referring to a portion indicated by ① in FIG. 11, an area where the first X-touch electrode line X-TEL-1 and the first Y-touch electrode line Y-TEL-1 cross on the first sub-area SAA1, is illustrated.

The second X-touch routing line X-TL-2 electrically connected to the second X-touch electrode line X-TEL-2 of the second sub-area SAA2 can be positioned on an area surrounding the first X-touch electrode line X-TEL-1 of the first sub-area SAA1.

At least one dummy electrode DME can be disposed between the second X-touch routing line X-TL-2 and the first X-touch electrode line X-TEL-1. The dummy electrode DME can be floated.

A parasitic capacitance formation or a signal interference between the second X-touch routing line X-TL-2 and the first X-touch electrode line X-TEL-1 can be prevented by the dummy electrode DME. Furthermore, a short circuit defect between the second X-touch routing line X-TL-2 and the first X-touch electrode line X-TEL-1 can be prevented by the dummy electrode DME.

Alternatively, in some cases, in when an identical signal is applied to the second X-touch routing line X-TL-2 and the first X-touch electrode line X-TEL-1 at the same time, the dummy electrode DME may not be disposed.

At least one dummy electrode DME can be disposed on an area surrounding the first Y-touch electrode line Y-TEL-1 on the first sub-area SAA1. The dummy electrode DME can be positioned on a portion of the area of the first sub-area SAA1 corresponding to an area where the first Y-touch routing line Y-TL-1 is disposed on the fourth sub-area SAA4 on a lower side of the first sub-area SAA1.

Referring to a portion indicated by ② in FIG. 11, an area where the second X-touch electrode line X-TEL-2 and the second Y-touch electrode line Y-TEL-2 cross on the second sub-area SAA2, is illustrated.

As the second Y-touch electrode line Y-TEL-2 is connected to the second Y-touch routing line Y-TL-2 disposed on the fifth sub-area SAA5, at least one dummy electrode DME can be disposed on an area surrounding by the second Y-touch electrode line Y-TEL-2.

At least one dummy electrode DME can be disposed on an area surrounding the second X-touch electrode line X-TEL-2. The dummy electrode DME positioned on an area surrounding the second X-touch electrode line X-TEL-2 can be disposed in order to correspond to an area where the first X-touch routing line X-TL-1 and the dummy electrode DME are disposed on the first sub-area SAA1. An area of the second X-touch electrode line X-TEL-2 disposed on the second sub-area SAA2 can be same as or similar to an area of the first X-touch electrode line X-TEL-1 disposed on the first sub-area SAA1.

Referring to a portion indicated by ③ in FIG. 11, an area where the third X-touch electrode line X-TEL-3 and the third Y-touch electrode line Y-TEL-3 cross on the third sub-area SAA3 is illustrated.

On a portion indicated by ③ of FIG. 11, similar to a portion indicated by ① in FIG. 11, the second X-touch routing line X-TL-2 connected to the second X-touch electrode line X-TEL-2 of the second sub-area SAA2 which is the central sub-area, can be disposed. The second X-touch electrode line X-TEL-2 disposed on the second sub-area SAA2 can be driven as a double feeding structure, thus a load of the touch sensor structure disposed on the central sub-area can be reduced.

Referring to a portion indicated by ④ in FIG. 12, an area where the fourth X-touch electrode line X-TEL-4 and the fourth Y-touch electrode line Y-TEL-4 cross on the fourth sub-area SAA4 is illustrated.

The fifth X-touch routing line X-TL-5 electrically connected to the fifth X-touch electrode line X-TEL-5 of the fifth sub-area SAA5 can be disposed on an area surrounding the fourth X-touch electrode line X-TEL-4 on the fourth sub-area SAA4. At least one dummy electrode DME can be positioned between the fifth X-touch routing line X-TL-5 and the fourth X-touch electrode line X-TEL-4.

The first Y-touch routing line-TL-1 electrically connected to the first Y-touch electrode line Y-TEL-1 of the first sub-area SAA1 can be positioned on an area surrounding the fourth Y-touch electrode line Y-TEL-4 on the fourth sub-area SAA4.

An area on which the first Y-touch routing line Y-TL-1 is disposed can corresponded to an area on which the dummy electrode DME is disposed, as illustrated in a portion indicated by ① in FIG. 11.

Alternatively, at least one dummy electrode DME can be disposed between the first Y-touch routing line Y-TL-1 and the fourth Y-touch electrode line Y-TEL-4.

The dummy electrode DME can prevent a signal interference or a short circuit defect between the first Y-touch routing line Y-TL-1 and the fourth Y-touch electrode line Y-TEL-4.

In this case, a size (e.g., a width) of an area where the dummy electrode DME is disposed between or inside the first Y-touch electrode line Y-TEL-1 on the first sub-area SAA1 can correspond to a size (e.g., a width) of an area where the first Y-touch routing line Y-TL-1 and the dummy electrode DME area disposed on the fourth sub-area SAA4.

The fifth X-touch routing line X-TL-5 can cross the first Y-touch routing line Y-TL-1. A part of one of the fifth X-touch routing line X-TL-5 and the first Y-touch routing line Y-TL-1 can be disposed on a different layer on an area crossing.

Referring to a portion indicated by ⑤ in FIG. 12, an area where the fifth X-touch electrode line X-TEL-5 and the fifth Y-touch electrode line Y-TEL-5 cross on the fifth sub-area SAA5, is illustrated.

The second Y-touch routing line Y-TL-2 connected to the second Y-touch electrode line Y-TEL-2 of the second sub-area SAA2 can be positioned on an area surrounding the fifth Y-touch electrode line Y-TEL-5. The dummy electrode DME can be positioned between the second Y-touch routing line Y-TL-2 and the fifth Y-touch electrode line Y-TEL-5.

The dummy electrode DME can be disposed on an area surrounding the fifth X-touch electrode line X-TEL-5.

An area on which the dummy electrode DME is disposed between the fifth X-touch electrode line X-TEL-5 can correspond to an area on which the fifth X-touch routing line X-TL-5 and the dummy electrode DME are disposed between the fourth X-touch electrode line X-TEL-4 of the fourth sub-area SAA4.

Referring to a portion indicated by ⑥ in FIG. 12, an area where the sixth X-touch electrode line X-TEL-6 and the sixth Y-touch electrode line Y-TEL-6 cross on the sixth sub-area SAA6, is illustrated.

On a portion indicated by ⑥ in FIG. 12, similar to a portion indicated by ④ in FIG. 12, the fifth X-touch routing line X-TL-5 can be positioned between the sixth X-touch electrode line X-TEL-6. The third Y-touch routing line Y-TL-3 can be disposed to cross the fifth X-touch routing line X-TL-5.

As described above, the touch sensor structure where the plurality of touch routing lines TL are disposed in the sub-areas SAA and the touch electrode lines TEL are disposed to be separated for the plurality of sub-areas SAA can be implemented.

The touch sensor structure, for example, can be implemented by cutting an electrode of a mesh shape into a plurality of opened portions.

Figure 13:
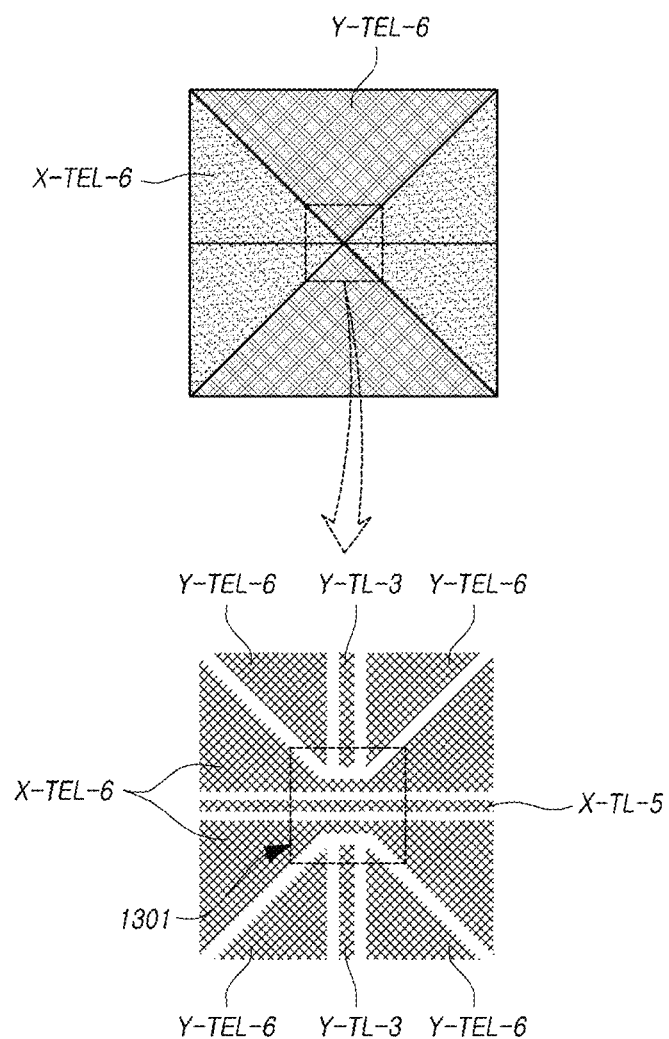
Figure 14:
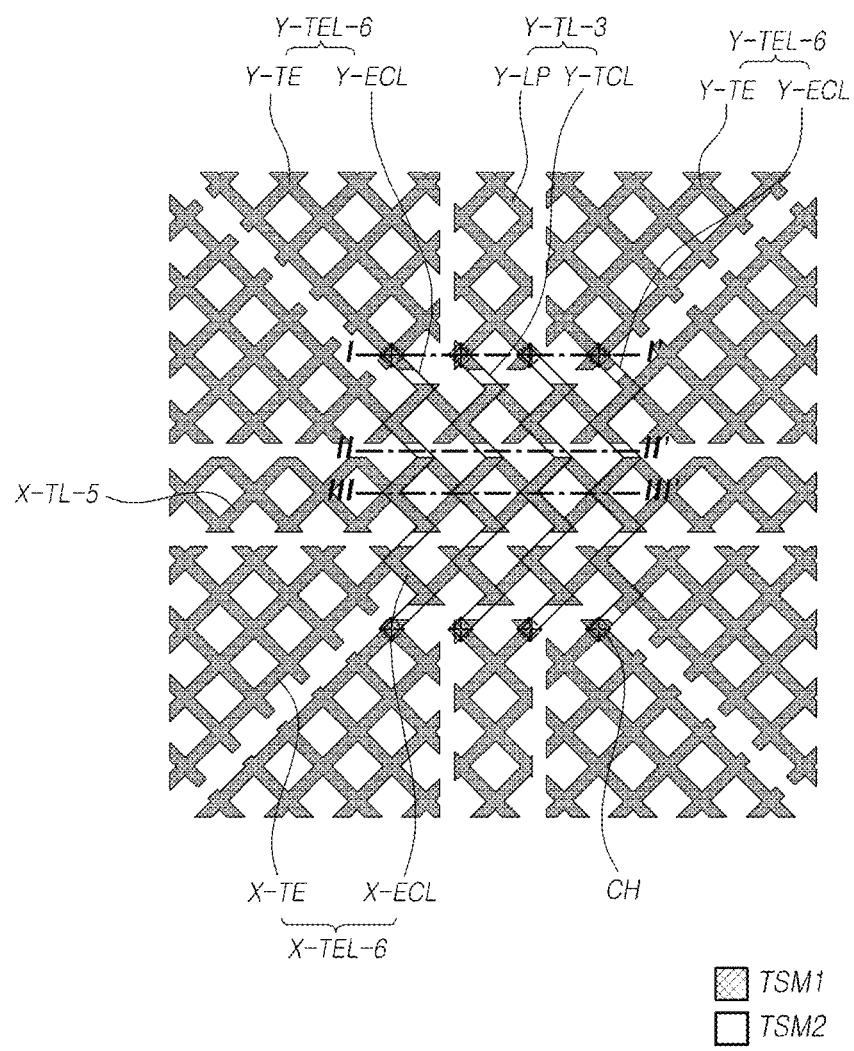
Figure 15:
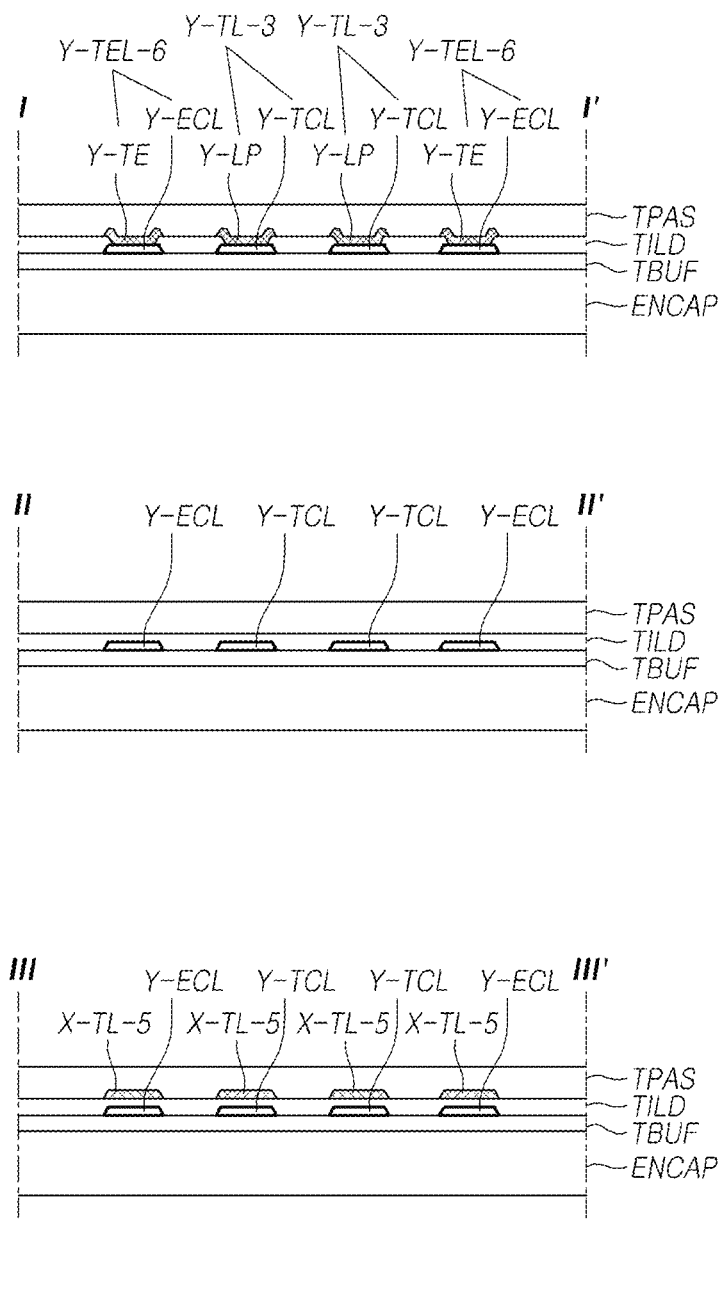

FIG. 13 illustrates an example where a portion indicated by ⑥ in FIG. 12 is implemented, according to some aspects of the present disclosure. FIG. 14 illustrates a specific example of a crossing area between touch electrode lines TEL indicated by 1301 in FIG. 13, according to some aspects of the present disclosure. FIG. 15 illustrates an example of a cross-sectional structure of I-I' portion, II-II' portion and portion illustrated in FIG. 14, according to some aspects of the present disclosure.

Referring to FIG. 13, an electrode including the plurality of opened portions can be cut in various directions and can be disposed as the touch electrode line TEL, the touch routing line TL and the dummy electrode DME.

For example, the electrode can be cut in a diagonal direction and the sixth X-touch electrode line X-TEL-6 and the sixth Y-touch electrode line Y-TEL-6 can be disposed.

The electrode can be cut in the first direction and the fifth X-touch routing line X-TL-5 can be disposed. The electrode can be cut in the second direction and the third Y-touch routing line Y-TL-3 can be disposed.

The dummy electrode DME can be disposed in a similar manner by cutting the electrode.

The touch electrode line TEL and the touch routing line TL or the like can be disposed by cutting the electrode, different touch electrode lines TEL or touch routing lines TL can cross each other.

For example, the sixth X-touch electrode line X-TEL-6 and the sixth Y-touch electrode line Y-TEL-6 can cross each other. the fifth X-touch routing line X-TL-5 and the third Y-touch routing line Y-TL-3 can cross.

A connecting pattern for an electrical connection can be disposed on an area where the touch electrode lines TEL or the touch routing lines TL are crossing.

Referring to FIGS. 14 and 15, the touch electrode line TEL and the touch routing line TL, for example, can be implemented by a first touch sensor metal TSM1 and a second touch sensor metal TSM2.

The first touch sensor metal TSM1 can be disposed on a different layer from the second touch sensor metal TSM2.

For example, a touch buffer layer TBUF can be disposed on the encapsulation layer ENCAP. The touch buffer layer TBUF, for example, can be an inorganic layer, but is not limited thereto.

The second touch sensor metal TSM2 can be disposed on the touch buffer layer TBUF.

A touch insulating layer TILD can be disposed on the second touch sensor metal TSM2.

The touch insulating layer TILD can be an inorganic layer. Alternatively, the touch insulating layer TILD can be an organic layer. In the case that the touch insulating layer TILD is an organic layer, at least one inorganic layer can be further disposed between the touch insulating layer TILD and the second touch sensor metal TSM2.

The first touch sensor metal TSM1 can be disposed on the touch insulating layer TILD.

A touch protective layer TPAS can be disposed on the first touch sensor metal TSM1.

A crossing structure of the touch electrode lines TEL or the touch routing lines TL can be implemented by using the first touch sensor metal TSM1 and the second touch sensor metal TSM2.

For example, the sixth X-touch electrode line X-TEL-6 can be disposed by cutting the electrode made of the first touch sensor metal TSM1. The X-touch electrode X-TE and the X-touch electrode connecting pattern X-ECL included in the sixth X-touch electrode line X-TEL-6 can be made of the first touch sensor metal TSM1.

The fifth X-touch routing line X-TL-5 can be made of the first touch sensor metal TSM1.

The sixth Y-touch electrode line Y-TEL-6 can include the Y-touch electrode Y-TE made of the first touch sensor metal TSM1 and the Y-touch electrode connecting pattern Y-ECL made of the second touch sensor metal TSM2.

The sixth Y-touch electrode line Y-TEL-6 can be electrically connected by the Y-touch electrode connecting pattern Y-ECL made of the second touch sensor metal TSM2 on an area where it crosses the sixth X-touch electrode line X-TEL-6.

The third Y-touch routing line Y-TL-3 can include a Y-touch routing portion Y-LP made of the first touch sensor metal TSM1 and a Y-touch routing connecting pattern Y-TCL made of the second touch sensor metal TSM2.

The third Y-touch routing line Y-TL-3 can be electrically connected by the Y-touch routing connecting pattern Y-TCL made of the second touch sensor metal TSM2 on an area where it crosses the fifth X-touch routing line X-TL-5.

As an example illustrated in I-I' portion of FIGS. 14 and 15, the Y-touch electrode Y-TE of the sixth Y-touch electrode line Y-TEL-6 can be electrically connected to the Y-touch electrode connecting pattern Y-ECL through a contact hole CH. The Y-touch routing portion Y-LP of the third Y-touch routing line Y-TL-3 can be electrically connected to the Y-touch routing connecting pattern Y-TCL through a contact hole CH.

As an example illustrated in II-II' portion of FIGS. 14 and 15, the Y-touch electrode connecting pattern Y-ECL or the Y-touch routing connecting pattern Y-TCL for a connection between the Y-touch electrodes Y-TE or a connection between the Y-touch routing portions Y-LP can be disposed even on an area where the first touch sensor metal TSM1 is not cut and arranged.

As an example illustrated in III-III' portion of FIGS. 14 and 15, the Y-touch electrode connecting pattern Y-ECL and the Y-touch routing connecting pattern Y-TCL can be disposed to be insulated from the fifth X-touch routing line X-TL-5 by the touch insulating layer TILD on an area where the fifth X-touch routing line X-TL-5 is disposed.

As described above, as a connection structure of the touch electrode lines TEL or the touch routing lines TL are implemented by using the touch sensor metals TSM disposed on several layers, the touch sensor structure can be implemented where the touch electrode lines TEL are disposed to be separated for the plurality of sub-areas SAA and the touch routing lines TL are disposed in the active area AA.

The embodiments of the present disclosure described above will be briefly described as follows.

A touch display device 100 according to embodiments of the present disclosure can include a plurality of light-emitting elements ED disposed on an active area AA of a display panel 110. The touch display device 100 can further include an encapsulation layer ENCAP disposed on the plurality of light-emitting elements ED and a plurality of X-touch electrode lines X-TEL on the encapsulation layer ENCAP, including two or more X-touch electrodes X-TE electrically connected to each other along a first direction, and disposed on each of a plurality of sub-areas SAA included in the active area AA separately. The touch display device 100 can further include a plurality of Y-touch electrode lines Y-TEL on the encapsulation layer ENCAP, including two or more Y-touch electrodes Y-TE electrically connected to each other along a second direction crossing the first direction, and disposed on each of the plurality of sub-areas SAA separately, and a plurality of touch routing lines TL electrically connected to one of the plurality of X-touch electrode lines X-TEL and the plurality of Y-touch electrode lines Y-TEL.

The plurality of sub-areas SAA can include a plurality of boundary sub-areas having a boundary positioned on a boundary of a first side of the active area AA or a boundary of a second side opposing to the first side and at least one central sub-area positioned between two of the plurality of boundary sub-areas.

A part of at least one of X-touch routing line X-TL electrically connected to the X-touch electrode line X-TEL disposed on the at least one central sub-area can be disposed on one of the plurality of boundary sub-areas.

The number of the X-touch routing line X-TL electrically connected to each of the X-touch electrode line X-TEL disposed on the at least one central sub-area can be greater than the number of the X-touch routing line X-TL electrically connected to each of the X-touch electrode line X-TEL disposed on the plurality of boundary sub-areas.

The X-touch electrode line X-TEL disposed on at least one central sub-area can include a first portion and a second portion which are separated from each other.

The X-touch routing line X-TL electrically connected to the first portion of the X-touch electrode line X-TEL can be different from the X-touch routing line X-TL electrically connected to the second portion of the X-touch electrode line X-TEL.

The number of the X-touch electrode line X-TEL disposed on the at least one central sub-area can be identical to the number of the X-touch electrode line X-TEL disposed on each of the plurality of boundary sub-areas.

The number of the Y-touch electrode line Y-TEL disposed on the at least one central sub-area can be smaller than the number of the Y-touch electrode line Y-TEL disposed on each of the plurality of boundary sub-areas.

A size of the at least one central sub-area can be smaller than a size of each of the plurality of boundary sub-areas.

At least one dummy electrode DME can be disposed between the X-touch routing line X-TL electrically connected to the X-touch electrode line X-TEL disposed on the at least one central sub-area and the X-touch electrode line X-TEL disposed on one of the plurality of boundary sub-areas.

The at least one dummy electrode DME can be floated.

At least one dummy electrode DME can be disposed on a part area of the at least one central sub-area corresponding to an area where the X-touch routing line X-TL electrically connected to the X-touch electrode line X-TEL disposed on the at least one central sub-area is disposed on one of the plurality of boundary sub-areas.

The at least one central sub-area can include a first central sub-area and a second central sub-area. A part of a Y-touch routing line Y-TL electrically connected to the Y-touch electrode line Y-TEL disposed on the first central sub-area can be disposed on the second central sub-area.

At least one dummy electrode DME can be disposed on a part area of the first central sub-area corresponding to an area where the Y-touch routing line Y-TL is disposed on the second central sub-area.

The plurality of boundary sub-areas can include a first boundary sub-area and a second boundary sub-area. A part of a Y-touch routing line Y-TL electrically connected to the Y-touch electrode line Y-TEL disposed on the first boundary sub-area can be disposed on the second boundary sub-area.

The Y-touch routing line Y-TL disposed on the second boundary sub-area can cross the X-touch routing line X-TL electrically connected to the X-touch electrode line X-TEL disposed on the at least one central sub-area.

At least one dummy electrode DME can be disposed on a part area of the first boundary area corresponding to an area where the Y-touch routing line Y-TL disposed on the second boundary sub-area.

On outside of the active area AA, a width of the X-touch routing line X-TL electrically connected to the X-touch electrode line X-TEL disposed on the at least one central sub-area can be greater than a width of the X-touch routing line X-TL electrically connected to the X-touch electrode line X-TEL disposed on the plurality of boundary sub-areas.

In examples above-mentioned, a touch driving signal can be supplied to the plurality of X-touch electrode lines X-TEL. A touch sensing signal can be detected from the plurality of Y-touch electrode lines Y-TEL.

A touch display device 100 according to embodiments of the present disclosure can include a plurality of X-touch electrode lines X-TEL including two or more X-touch electrodes X-TE electrically connected to each other along a first direction and disposed on each of a plurality of sub-areas SAA included in an active area AA separately. The touch display device 100 can further include a plurality of Y-touch electrode lines Y-TEL including two or more Y-touch electrodes Y-TE electrically connected to each other along a second direction crossing the first direction and disposed on each of the plurality of sub-areas SAA separately. The touch display device 100 can further include a plurality of touch routing lines TL electrically connected to one of the plurality of X-touch electrode lines X-TEL and the plurality of Y-touch electrode lines Y-TEL, wherein the plurality of sub-areas SAA include a plurality of boundary sub-areas SAA having a boundary positioned on a boundary of a first side of the active area AA or a boundary of a second side opposing to the first side and at least one central sub-area positioned between two of the plurality of boundary sub-areas, and wherein a part of at least one of X-touch routing line X-TL electrically connected to the X-touch electrode line X-TEL disposed on the at least one central sub-area is disposed on one of the plurality of boundary sub-areas.

A touch display device 100 according to embodiments of the present disclosure can include a plurality of X-touch electrode lines X-TEL including two or more X-touch electrodes X-TE electrically connected to each other along a first direction and disposed on each of a plurality of sub-areas SAA included in an active area AA separately. The touch display device 100 can further include a plurality of Y-touch electrode lines Y-TEL including two or more Y-touch electrodes Y-TE electrically connected to each other along a second direction crossing the first direction and disposed on each of the plurality of sub-areas SAA separately. The touch display device 100 can further include a plurality of X-touch routing lines X-TL electrically connected to one of the plurality of X-touch electrode lines X-TEL, and a plurality of Y-touch routing lines Y-TL electrically connected to one of the plurality of Y-touch electrode lines Y-TEL, wherein some of the plurality of X-touch routing lines X-TL is disposed on a first sub-area of the plurality of sub-areas SAA and is electrically connected to the X-touch electrode line X-TEL disposed on a second sub-area, and some of the plurality of Y-touch routing lines Y-TL is disposed on the first sub-area and is electrically connected to the Y-touch electrode line Y-TEL disposed on a third sub-area, and wherein the X-touch routing line X-TL disposed on the first sub-area crosses the Y-touch routing line Y-TL disposed on the first sub-area.

At least one dummy electrode DME can be disposed on at least one of a part area of the second sub-area corresponding to an area where the X-touch routing line X-TL is disposed on the first sub-area or a part area of the third sub-area corresponding to an area where the Y-touch routing line Y-TL is disposed on the first sub-area.

At least one of the plurality of X-touch routing lines X-TL or the plurality of Y-touch routing lines Y-TL disposed on the second sub-area or the third sub-area can cross an area where the at least one dummy electrode DME is disposed and can be electrically connected to a touch electrode line TEL disposed on a sub-area SAA other than a sub-area SAA on which the at least one dummy electrode DME is disposed.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device, comprising:
a plurality of light-emitting elements disposed on an active area of a display panel;
an encapsulation layer disposed on the plurality of light-emitting elements;
a plurality of X-touch electrode lines on the encapsulation layer, comprising two or more X-touch electrodes electrically connected to each other along a first direction, and disposed on each of a plurality of sub-areas included in the active area separately;
a plurality of Y-touch electrode lines on the encapsulation layer, comprising two or more Y-touch electrodes electrically connected to each other along a second direction crossing the first direction, and disposed on each of the plurality of sub-areas separately; and
a plurality of touch routing lines electrically connected to one of the plurality of X-touch electrode lines and the plurality of Y-touch electrode lines, wherein the plurality of sub-areas include:
a plurality of boundary sub-areas having a boundary positioned on a first boundary of a first side of the active area or a second boundary of a second side opposing the first side, and
at least one central sub-area positioned between two of the plurality of boundary sub-areas, at least one of the plurality of boundary sub-area including a plurality of X-touch routing lines, wherein a part of at least one of the plurality of X-touch routing lines is electrically connected to one of the plurality of X-touch electrode lines,
wherein the plurality of X-touch electrode lines in the at least one central sub-area are connected to two or more of the plurality of X-touch routing lines on both sides of the at least one central sub-area.

2. The touch display device of claim 1, wherein each of the plurality of X-touch electrode lines in the at least one central sub-area comprises a first portion and a second portion separated from each other, and wherein each of the first portion and the second portion is connected to a different one of the plurality of X-touch routing lines.

3. The touch display device of claim 1, wherein a number of the plurality of X-touch electrode lines in the at least one central sub-area is identical to a number of the plurality of X-touch electrode lines in each of the plurality of boundary sub-areas, and wherein a number of the plurality of Y-touch electrode lines in the at least one central sub-area is smaller than a number of the plurality of Y-touch electrode lines in each of the plurality of boundary sub-areas.

4. The touch display device of claim 1, wherein a size of the at least one central sub-area is smaller than a size of each of the plurality of boundary sub-areas.

5. The touch display device of claim 1, further comprising:
at least one first dummy electrode disposed between the X-touch routing line electrically connected to the plurality of X-touch electrode lines in the at least one central sub-area; and
at least one second dummy electrode disposed between the plurality of X-touch electrode lines in one of the plurality of boundary sub-areas.

6. The touch display device of claim 5, wherein the at least one first dummy electrode and the at least one second dummy electrode are floating.

7. The touch display device of claim 1, further comprising:
at least one first dummy electrode is disposed on a portion of the at least one central sub-area corresponding to one of the plurality of X-touch routing lines in the at least one central sub-area, the one of the plurality of X-touch routing lines being electrically connected to one of the plurality of X-touch electrode lines in one of the plurality of boundary sub-areas.

8. The touch display device of claim 1, wherein the at least one central sub-area comprises a first central sub-area and a second central sub-area, and wherein a part of a Y-touch routing line to which each of a plurality of Y-touch electrode lines in the first central sub-area is connected, is disposed in the second central sub-area.

9. The touch display device of claim 8, further comprising:
at least one dummy electrode disposed on an area of the first central sub-area corresponding to an area where the Y-touch routing line is disposed.

10. The touch display device of claim 8, wherein the Y-touch routing line in the second boundary sub-area crosses one of the plurality of X-touch routing lines that is electrically connected to one of the plurality of X-touch electrode lines in the at least one central sub-area.

11. The touch display device of claim 8, further comprising:
at least one dummy electrode disposed in an area of the first boundary area corresponding to an area where the Y-touch routing line is disposed.

12. The touch display device of claim 1, wherein, on outside of the active area, a width of a first one of the plurality of X-touch routing lines that is electrically connected to at least one of the plurality of X-touch electrode lines in the at least one central sub-area, is greater than a width of a second one of the plurality of X-touch routing lines that is electrically connected to at least one of the plurality of X-touch electrode lines in the plurality of boundary sub-areas.

13. The touch display device of claim 1, wherein a touch driving signal is supplied to the plurality of X-touch electrode lines, and a touch sensing signal is detected from the plurality of Y-touch electrode lines.

14. A touch display device, comprising:
a plurality of X-touch electrode lines comprising two or more X-touch electrodes electrically connected to each other along a first direction, and disposed on each of a plurality of sub-areas included in an active area separately; a plurality of Y-touch electrode lines comprising two or more Y-touch electrodes electrically connected to each other along a second direction crossing the first direction, and disposed on each of the plurality of sub-areas separately; and
a plurality of touch routing lines electrically connected to one of the plurality of X-touch electrode lines and the plurality of Y-touch electrode lines, wherein the plurality of sub-areas comprise:
a plurality of boundary sub-areas positioned on a first boundary of a first side of the active area or a second boundary of a second side opposing the first side, and
at least one central sub-area positioned between two of the plurality of boundary sub-areas, at least one of the plurality of boundary sub-area including a plurality of X-touch routing lines, wherein a part of at least one of the plurality of X-touch routing lines is in the active area,
wherein each of the plurality of X-touch electrode lines in the at least one central sub-area comprises a first portion and a second portion separated from each other, and wherein each of the first portion and the second portion is connected to a different one of the plurality of X-touch routing lines.

15. A touch display device, comprising: a plurality of X-touch electrode lines comprising two or more X-touch electrodes electrically connected to each other along a first direction, and disposed on each of a plurality of sub-areas included in an active area separately, the plurality of sub-areas comprising a plurality of boundary sub-areas positioned on a first side of the active area or a second side opposing the first side and at least one central sub-area positioned between two of the plurality of boundary sub-areas; a plurality of Y-touch electrode lines comprising two or more Y-touch electrodes electrically connected to each other along a second direction crossing the first direction, and disposed on each of the plurality of sub-areas separately; a plurality of X-touch routing lines electrically connected to one of the plurality of X-touch electrode lines; and a plurality of Y-touch routing lines electrically connected to one of the plurality of Y-touch electrode lines, wherein at least one or more of the plurality of X-touch routing lines is disposed on a first boundary sub-area of the plurality of boundary sub-areas and is electrically connected to at least one of the plurality of X-touch electrode lines disposed on a first central sub-area of the at least one central sub-area, at least one or more of the plurality of Y-touch routing lines is disposed on the first boundary sub-area of the plurality of boundary sub-areas and is electrically connected to at least one of the plurality of the Y-touch electrode line disposed on a second boundary sub-area of the plurality of boundary sub-areas, and the one or more of the plurality of X-touch routing lines in the first boundary sub-area crosses the one or more of the plurality of Y-touch routing lines in the first boundary sub-area, wherein a part of a Y-touch routing line to which each of a plurality of Y-touch electrode lines in the first central sub-area is connected is disposed in a second central sub-area adjacent to the first central sub-area.

16. The touch display device of claim 15, further comprising:
at least one dummy electrode disposed on at least one of:
(1) a portion of the first central sub-area that corresponds to a portion where the one or more of the plurality of X-touch routing lines are disposed in the first boundary sub-area, and
(2) a portion of the second boundary sub-area that corresponds to a portion where the one or more of the plurality of Y-touch routing lines are disposed in the first boundary sub-area.

17. The touch display device of claim 16, wherein at least one of the plurality of X-touch routing lines or the plurality of Y-touch routing lines in the first central sub-area or the second boundary sub-area crosses the portion in which the at least one dummy electrode is disposed, and is electrically connected to a touch electrode line in a sub-area other than a sub-area on which the at least one dummy electrode is disposed.

18. The touch display device of claim 15, wherein the plurality of X-touch electrode lines and the plurality of Y-touch electrode lines are disposed on a same layer.

19. The touch display device of claim 15, wherein the plurality of X-touch electrode lines and the plurality of X-touch routing lines are disposed on a same layer.

* * * * *